(12) United States Patent
Waggoner et al.

(10) Patent No.: US 9,678,724 B2
(45) Date of Patent: Jun. 13, 2017

(54) SYSTEM AND METHOD FOR COMBINING TEXT EDITING AND TREE ENCODING FOR COMPUTER PROGRAMS

(71) Applicant: Intentional Software Corporation, Bellevue, WA (US)

(72) Inventors: David Waggoner, Bothell, WA (US); Melanie A. Jensenworth, Redmond, WA (US); Paul Kwiatkowski, Redmond, WA (US); Charles Simonyi, Medina, WA (US)

(73) Assignee: Intentional Software Corporation, Bellevue, WA (US)

( * ) Notice: Subject to any disclaimer, the term of this patent is extended or adjusted under 35 U.S.C. 154(b) by 0 days.

(21) Appl. No.: 14/725,011

(22) Filed: May 29, 2015

(65) Prior Publication Data

US 2016/0350084 A1     Dec. 1, 2016

(51) Int. Cl.
*G06F 9/44* (2006.01)

(52) U.S. Cl.
CPC ............... *G06F 8/34* (2013.01); *G06F 8/33* (2013.01); *G06F 8/73* (2013.01)

(58) Field of Classification Search
CPC ............... G06F 8/33; G06F 8/34; G06F 8/73
USPC ............... 717/113, 105, 109, 133, 144
See application file for complete search history.

(56) References Cited

U.S. PATENT DOCUMENTS

| | | | | |
|---|---|---|---|---|
| 5,748,975 | A * | 5/1998 | Van De Vanter | G06F 8/33 715/236 |
| 6,269,475 | B1 * | 7/2001 | Farrell | G06F 8/33 717/113 |
| 2003/0167266 | A1 * | 9/2003 | Saldanha | G06F 17/2229 |
| 2004/0225964 | A1 * | 11/2004 | Simonyi | G06F 8/71 715/256 |

(Continued)

OTHER PUBLICATIONS

"The documentary structure of source code" by Michael L Van De Vanter, Information and software technology, vol. 44, Issue 13, Oct. 2002, pp. 767-782.*

*Primary Examiner* — Wei Zhen
*Assistant Examiner* — Mohammed Huda
(74) *Attorney, Agent, or Firm* — Law Office of R. Alan Burnett, PS

(57) ABSTRACT

A system and method for combining text editing and tree encoding for computer programs and related software. Source code for programs and the like are stored using a maintaining a structured tree representation comprising a plurality of nodes, including nodes associated with respective identifiers, operands, operators, variables, and flow control elements in the source code, and nodes associated with formatting aspects of a text-based representation of the source code. During program editing, a continuous loop of operations is performed to support interactive editing of the source code, including unparsing the structured tree representation to derive tokens, processing the tokens to generate an editable text-based representation of the source code, detecting edits to the source code via the text-based representation, and in response thereto generating one or more (Continued)

new tokens and/or deleting one or more existing tokens, parsing the tokens, and processing the parsed tokens to update the structure tree representation of the source code to reflect the edited source code.

32 Claims, 21 Drawing Sheets

(56) References Cited

U.S. PATENT DOCUMENTS

| | | | |
|---|---|---|---|
| 2004/0250237 A1* | 12/2004 | Simonyi | G06F 8/33 717/105 |
| 2005/0033733 A1* | 2/2005 | Shadmon | G06F 17/30911 |
| 2006/0026157 A1* | 2/2006 | Gupta | G06F 17/30914 |
| 2012/0324422 A1* | 12/2012 | Chartier | G06F 8/33 717/109 |

* cited by examiner

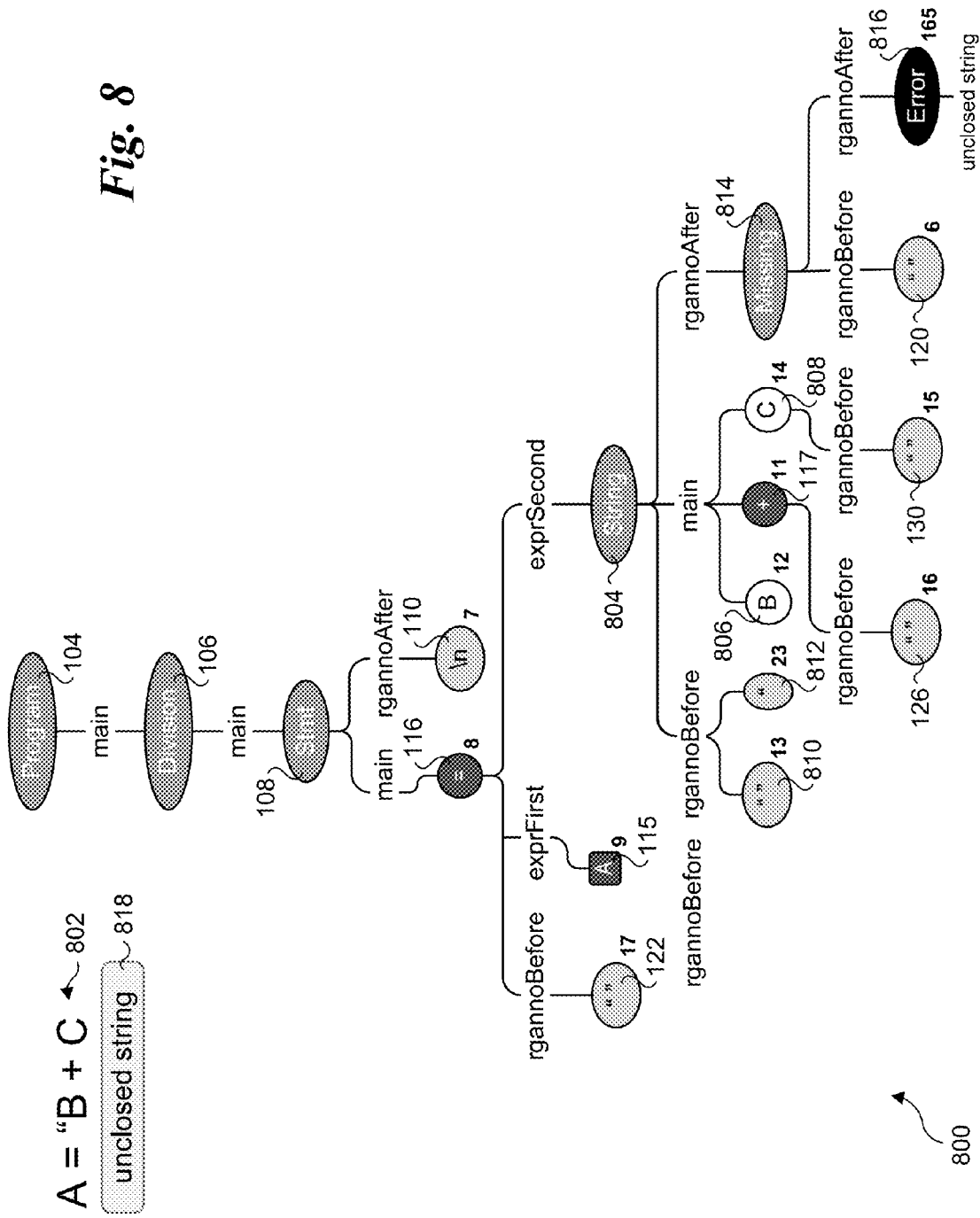

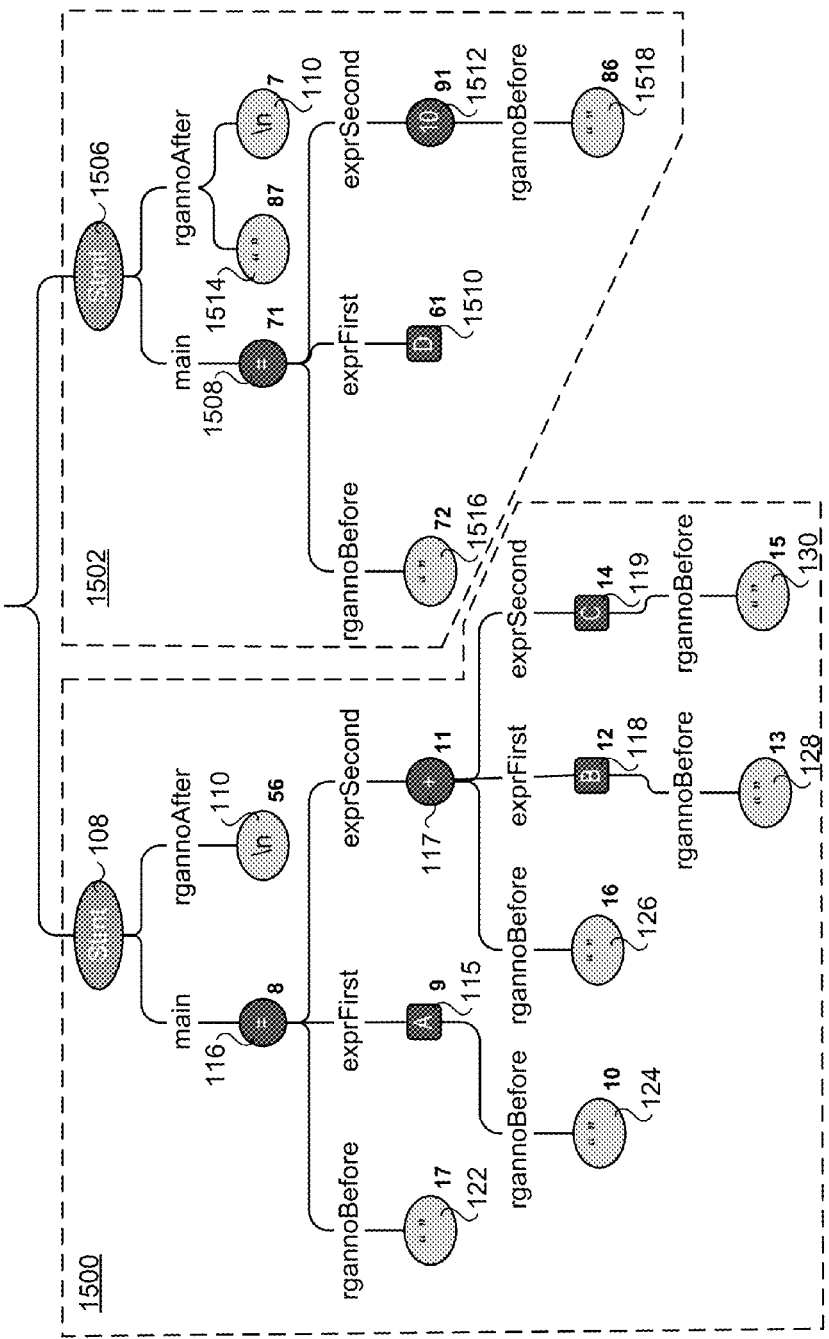

SYSTEM AND METHOD FOR COMBINING TEXT EDITING AND TREE ENCODING FOR COMPUTER PROGRAMS

FIELD OF THE INVENTION

The field of invention relates generally to computer programming and, more specifically but not exclusively relates to techniques for combining text editing and tree encoding for computer programs.

BACKGROUND INFORMATION

Computer programs are generally written in a high-level programming language such as Java or C++, which is edited and stored as text-based source code. Compilers are then used to translate the source code instructions of the high-level programming language into machine instructions that can be executed by a computer. The compilation process is generally divided into six phases:
1. Lexical analysis
2. Syntactic analysis
3. Semantic analysis
4. Intermediate code generation
5. Code optimization
6. Final code generation During lexical analysis, the source code of the computer program is scanned and components or tokens of the high-level language are identified. The compiler then converts the source code into a series of tokens that can be processed during syntactic analysis. For example, during lexical analysis, the compiler would identify the statement,
cTable=1.0;
as tokens including the variable (cTable), the assignment operator (=), the constant (1.0), and a semicolon. A variable, operator, constant, and semicolon are tokens of the high-level language.

During syntactic analysis (also referred to as "parsing"), the compiler processes the tokens and generates a syntax tree to represent the program based on the syntax (also referred to as "grammar") of the programming language. A syntax tree is a tree structure in which operators are represented by non-leaf nodes and their operands are represented by child nodes. In the above example, the assignment operator (=) has two operands: the variable (cTable) and the constant (1.0). The terms "parse tree" and "syntax tree" are used interchangeably in this description to refer to the syntax-based tree generated as a result of syntactic analysis. For example, such a tree optionally may describe the derivation of the syntactic structure of the computer program (e.g., it may describe that a certain token is an identifier, which is an expression as defined by the syntax). Syntax-based trees may also be referred to as "concrete syntax trees" when the derivation of the syntactic structure is included, and as "abstract syntax trees" when the derivation is not included.

During semantic analysis, the compiler modifies the syntax tree to ensure semantic correctness. For example, if the variable (cTable) is an integer and the constant (1.0) is a floating-point, then during semantic analysis a floating point to integer conversion would be added to the syntax tree.

During intermediate code generation, code optimization, and final code generation, the compiler generates machine instructions to implement the program represented by the syntax tree. A computer can then execute the machine instructions.

A system has been described for generating and maintaining a computer program represented as an intentional program tree, which is a type of syntax tree. (For example, U.S. Pat. No. 5,790,863 entitled "Method and System for Generating and Displaying a Computer Program" and U.S. Pat. No. 6,097,888 entitled "Method and System for Reducing an Intentional Program Tree Represented by High-Level Computational Constructs," and U.S. Pat. No. 7,607,099 entitled "Method and system for reversible design tree transformations," each of which is hereby incorporated by reference in its entirety for all purposes.) The system provides a mechanism for directly manipulating nodes corresponding to "program elements" by adding, deleting, and moving the nodes within an intentional program tree. An intentional program tree is one type of "program tree." A "program tree" is a tree representation of a computer program that includes operator nodes and operand nodes representing program elements. A program tree may also include inter-node references (i.e., graph structures linking nodes in the tree), such as a reference from a declaration node of an identifier to the node that defines that identifier's type. For example, a node representing the declaration of an identifier to be an integer includes a reference (i.e., non-tree pointer) to a node that defines the integer type. An abstract syntax tree and a concrete syntax tree are examples of a program tree. Once a program tree is generated, the system performs the steps of semantic analysis, intermediate code generation, code optimization, and final code generation to transform the computer program represented by the program tree into executable code.

Various techniques have been used to control the editing of computer program. These techniques include text-based editors and structured editors. A programmer uses a text-based editor to enter the letters, numbers, and other characters that make up the source code for the computer program. The text-based editor may store these characters in an unstructured format in a source code file using an ASCII format and delimiting each line by an end-of-line character. The format is unstructured because computer program in that format needs to be parsed to identify the syntactic elements.

Modern integrated development environments (IDEs), such as Microsoft Visual Studio, Apple Xcode, Eclipse, Oracle Netbeans, and IntelliJ support interactive lexical and syntactic analysis of text-based source code as it is edited by the programmer via the IDE's editor. The IDEs typically maintain a structured representation of the source code based on the hierarchy of the programming language syntax. If the editor detects a lexical or syntactic error, it typically notifies the programmer via some indicia in the editor, such as marking the detected error in the portion of code for which the error is detected. Each of these IDEs store the source code in text format (e.g., as .h and .cpp files for C++, .Java files for Java, etc.), and typically rebuild the structured representation upon launching editing of an existing project. Notably, the text-based source code is not designed to be generated from the structured representation alone.

Each of the foregoing IDEs also support some form of source control, either via built-in functionality or integrated with a third-party source code repository, such as Subversion. Source control enables different versions of an application to be saved and restored, and includes information relating to identities of programmers who modify the source code, which portion of the source code has been modified for a given revision, and revision time-stamp information. All of this information is stored separate from the text-based source code and the structured representation under conventional implementations. IDEs may also provide editing tools that employ other types of structure representations, such as Xcode's Interface Builder (IB), which is used in connection with developing iOS applications. IB enables programmers to graphically design user interfaces, as well as visually link code to support various user interface functionality. IB generates an XML-based output file (XIB), which is used by Xcode to build the iOS application.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 8 is a diagram of a structured tree representation of a source code statement including an unclosed string, according to one embodiment;

FIGS. 15a and 15b are structured tree representations of a pair of source code statements that are swapped in order to demonstrate moving of source code, according to one embodiment;

DETAILED DESCRIPTION

Figure 1:
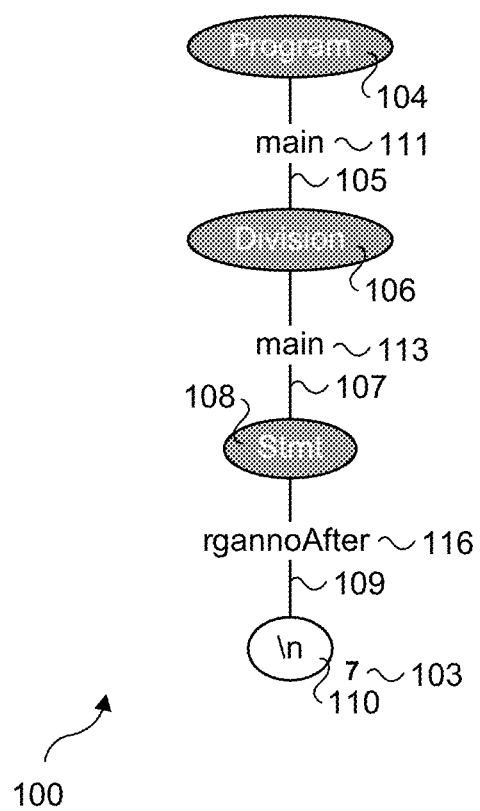
FIG. 1 is a diagram of a structured tree representation of source code when opening a new file, according to one embodiment.

Embodiments of a system and method for combining text editing and tree encoding for computer programs and related software are described herein. In the following description, numerous specific details are set forth (such as use of the C++ language and syntax) to provide a thorough understanding of embodiments of the invention. One skilled in the relevant art will recognize, however, that the invention can be practiced without one or more of the specific details, or with other methods, components, materials, etc. In other instances, well-known structures, and operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

Intentional encoding of programs and other structured data has many advantages, such as supporting multiple notations, structured editing, easy access for programmatic transformation (refactoring or reformatting) of the program, inclusion of non-textual elements in the program, and uniform treatment of editing history and groupware operations. A disadvantage of intentional encoding is that the editing of the program is different from the traditional text editing model that uses syntax parsers to create a parse tree from editing the primary source of the program stored as text. The traditional model lends a certain efficiency to memorizing the editing operations and typing in a program by relying on the similarities of programming language syntax and natural language syntax.

In accordance with aspects of embodiments disclosed herein, the benefits of intentional encoding and text representation are combined in an integrated program editing system. This combining of intentional encoding and text representation is facilitated, in part, by continuously performing an "instant loop" comprising unparsing—then text editing—then parsing and repeating from the start. To make the loop continuous, selected key information is preserved through the steps. The primary information can be considered to be the intentional or other tree representation (also simply referred to as a "tree") before unparsing (and after parsing), or, with some minor restrictions, it can also be the text after unparsing. Having a continuous "instant" loop, rather than a single "conversion" step from one format to another is useful for both the human user and the programmatic extensions, in that changes from automatic program transformations, including intentional source control, can be made to the tree form (just before unparsing) and changes by the user can be made to the text form, with instant feedback from exploitations of the advantages of intentional encoding listed above without the user having to type some sort of termination. This is generally known in the art as "modelessness of the interface," which is supported by embodiments discussed below.

An aspect of the embodiments relate to the preservation of information through the various steps, in particular to the "identity" of the various parts—which is very useful for groupware operations—and the representation in the tree of text that is, in the previous art, not parsed either by design (such as comments or "white space") or because the text has syntax errors. Some nodes of the tree represent recognized syntactic entities (e.g., statement_list, statement, parameter, etc. Other nodes are specific instances (e.g., goto, Unary-, etc.) and others are a combination of the two, such as the specific identifier 'A'.

Nodes contain offspring as defined by the syntax rules: a statement_list has statements under it as offspring, a Unary- has an instance of an operator or operand under it, etc. Some nodes (representing entities with complex text syntax) will also contain a list of "syntactic sugar" nodes (s-nodes). Syntactic sugar are the expected punctuation in an entity. For example, an "if" statement in the language C might look like this: if(f) goto L; here the syntactic sugar for if are the '(' and ')' starting and ending parentheticals. In one embodiment, s-nodes contain a single token or they may be the value "missing," as discussed below.

A node may also contain one or more possibly empty lists of np-nodes representing non-parsed information before and after the information the node represents. In one embodiment, this is implemented for each node. Generally, the np-nodes may be white space, comments, or tokens (e.g., representing errors). White space np-nodes contain white space: spaces, tabs, end of lines (EOL's) (if the syntax ignores EOL's). Comment np-nodes contain tokens corresponding to comments added to the source code.

Strings are represented by an operand node with the string contents as tokens and the string delimiters as syntactic sugar. Operands of extended representation (non-textual operands that cannot be further described in text syntax, for example images, video, or sound) are nodes that contain a value indicating the operand is an extended representation, and/or may be represented as some iconic representation, which may be a thumbnail, icon, or text that is editable only as a whole, such as a URL.

In one respect, a token is an atom of the syntax, similar to its conventional usage. However, under one or more embodiments it is also the carrier of the identity (meaning who and when created it) of the information. Consequently, in one embodiment, every token and every node that is the result of a token or represents a token includes a field for the identity information. One more difference is that the white space, and illegal character combinations as defined by the syntax are also considered tokens, so that the parser is enabled to process them.

Identities can have many representations. In one embodiment, each token has an associated globally unique identity (i.e., a GUID). Alternatively, a token includes the GUID for the creator, and some further disambiguator that is specific to the creator and (with the help of auxiliary structures, or by direct inclusion) would also decode to the time of the creation. Generally, timestamp information may be saved as source code is edited or at the time edited source code is saved.

An "unparser" creates a linear string of tokens from a tree of nodes. This is performed by recursively inspecting the nodes, outputting the non-parsed information before, outputting the contents appropriately interspersed with syntactic sugar, then outputting the non-parsed information after. If the needed syntactic sugar says "missing," it will be omitted from the output. However if there is no syntactic sugar at all (which would be the case if the input was the result of a programmatic generation or transformation), the normal default is output (for example the starting an ending parentheticals '(' and ')' and the semicolon ';' for the "if" statement).

The unparser can annotate the token with formatting information so that different syntactic elements (delimiters, comments, strings, identifiers, erroneous tokens, etc.) can be identified by the user. This formatting information, intended for display purposes only, is internally ignored by the rest of the algorithm.

The list of tokens represents a list of characters (the "program text") when each token is expanded to the character(s) it represents. In one embodiment a node generates a token of extended representation. This token contains (or is connected to by any of a number of methods know in the art, for example by 'out-of-band' table, hashing, etc.) the extended representation. The program text need not be actually expanded (i.e., can be kept virtual), except for the area where the editing will take place.

Users are enabled to edit the text source code in the conventional manner, including insertions of characters (including whitespace characters) from the keyboard, and editing existing text via deletes, backspaces, moves, and replaces. Copying is also supported, as is cutting and pasting.

The editing is defined in terms of character positions in the text. A position is defined in terms of the identity of the node, the identification of how the token was produced (e.g., "head/crown", "before", "sugar", "after", etc.), the token index within the production, and the character index within the token.

Editing is performed during a production of a token stream. An edit is a replacement of characters (which can be an empty set, i.e., a place) in the program text either by some new text or by some existing text that is actually a sequence of tokens possibly preceded and followed by some text (i.e., partial tokens, c.f. "character index within a token" above). From this follows that at the edit boundaries new text may appear, otherwise the new stream is a straightforward copy of the old token list. At the boundaries, the text is tokenized, which may cause the next token to be opened up to be text. For example, if a new text '+' is followed by a token '++', the latter will have to be opened up and the result will be the token '++' with the text + remaining. This process will continue until the next token does not have to be opened.

In one embodiment, tokenization errors are turned into error tokens that carry their character contents without loss of information (like identifiers.) Tokens containing any new text (or containing only new text) will be considered new and get a new identity. Copies of tokens that do not contain new text will also get new identities. Tokens that are moved in their entirety retain their identities.

Generally, the edited token stream can be parsed by a number of existing syntax parsers. In a preferred embodiment, a recursive descent parser is used. In one embodiment, the parser, however has to build its parse tree according to the needs of the instant loop, as given in the following points.
1. The identities are carried from the token to the node (note that there will be at least one node for every input token in one embodiment).
2. White space tokens are placed in the appropriate list of non-parsed nodes (np-nodes) (before/after).
3. Comment bodies are collected under a comment node and the comment node is placed in the appropriate list of np-nodes.
4. When a syntax error is detected during parsing, the tokens up to a recovery point are collected in the appropriate list of np-nodes.

The syntactic sugar, when encountered, is noted in the sugar list. When optional syntactic sugar is missing, a "missing" entry is made. When required syntactic sugar is missing, it may be inserted with an error annotation on the entry, or some of the input can be turned into an error up to a recovery point, depending on the capabilities of the parser used.

Structured Tree Representations of Exemplary Statements and Expressions

FIGS. 1, 1a, 1b, 2-8, 9a, 9b, 10, and 12-15 illustrate exemplary source code statements and expressions and corresponding structured tree information that is dynamically generated as the source code is edited. As will be explained in further detail and illustrated below, in addition to a tree structure, the structured tree representation includes associated data that is not shown on the trees in many of the illustrations herein for simplicity and clarity; however, it will be recognized that such information is included in the actual structured tree representations, either through direct inclusion or indirect linkage to other data structures.

FIG. 1 shows a tree 100 illustrating selected aspects of a structured tree representation that is generated upon opening a new (i.e., empty) program. Tree 100 includes a program node 104, a division node 106, a statement (Stmt) node 108, and a newline ("\n") node 110, connected by respective branches 105, 107, and 109. Tree 100 also shows examples of branch annotations, including "main" annotations 111 and 113 for branches 105 and 107, and an "rgannoAfter" annotation 116 for branch 109. Newline node 110 also includes a GUID index 103 comprising an integer '7'. The program node and division node are included in the Figures herein for overall program context, but otherwise the focus of subsequent figures is on the node structure below the division nodes.

Figure 1A:
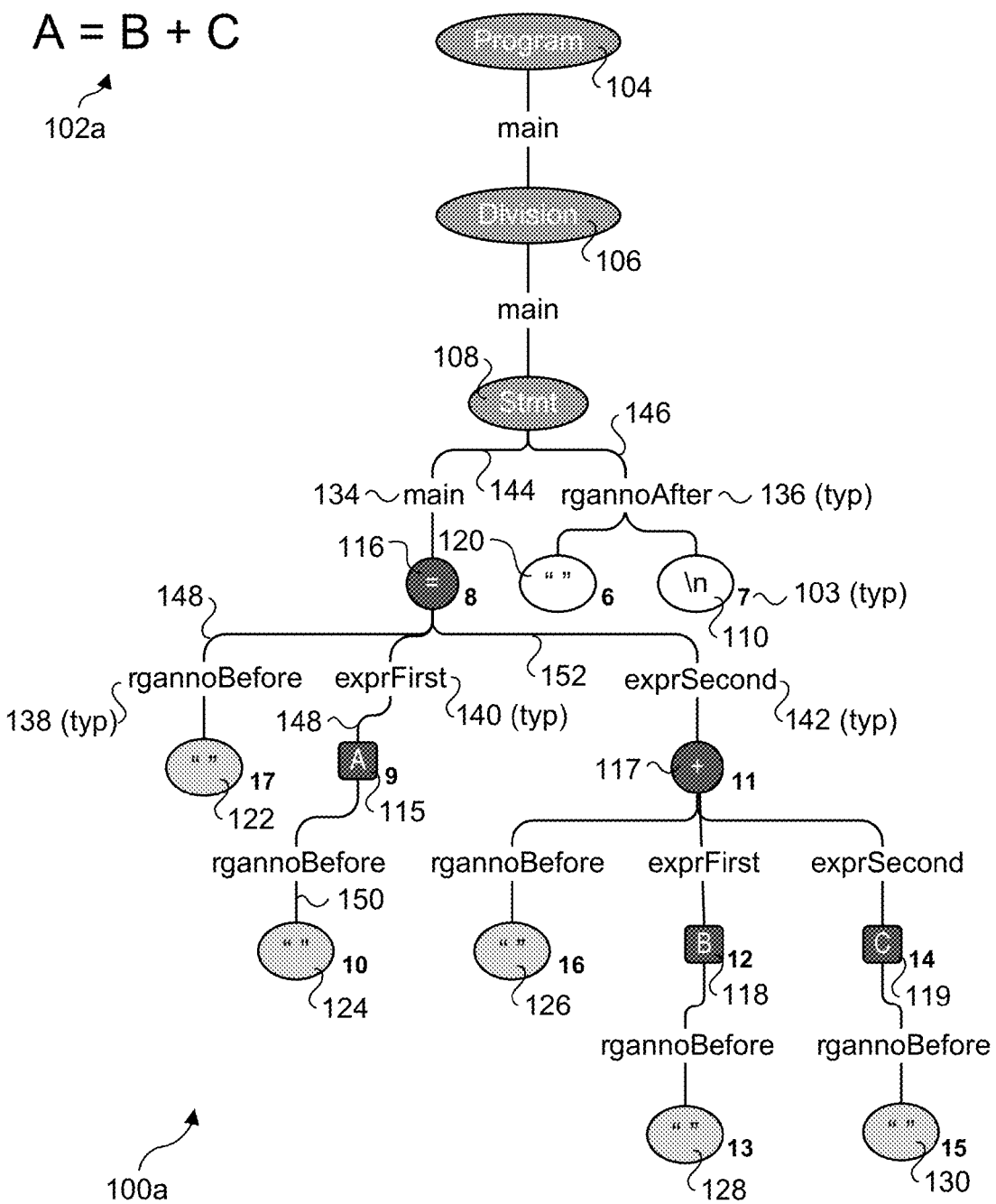
FIG. 1a is a diagram of a structured tree representation of a source code statement "A=B+C", according to one embodiment.

FIG. 1a shows a tree 100a corresponding to a statement 102a of "A=B+C." As with tree 100, tree 100a includes a program node 104, a division node 106, and a statement node 108. The node structure below statement node 108 includes an 'A' operand node 115, an '=' assignment operator node 116, a '+' operator node 117, a 'B' operand node 118 and a 'C' operand node 119. In addition to being operands in the statements herein, 'A', 'B', and 'C' are representative of variable identifiers commonly used in various programming languages. The inclusion of operand and operator nodes is similar to a conventional parse tree; however, tree 100a further includes nodes defining the textural formatting of statement 102a. These include whitespace nodes 120, 122, 124, 126, 128, and 130.

Tree 100a also includes various branches connecting the node structure, each including an associated annotation, as depicted by annotations including a "main" annotation 134, an rgannoAfter (Range annotation After) annotation 136, multiple rgannoBefore (Range annotation Before) annotations 138, a pair of exprFirst (first expression) annotations 140, and a pair of exprSecond (second expression) annotations 142. The "rg" for the rgannoBefore and rgannoAfter annotations means there is a range of zero or more np-nodes before or after (as applicable) the parent node for which they are associated. Generally, the whitespace characters for a range may include spaces and tabs.

Each branch connects a parent node to one or more child nodes. When a child node is a terminating node it is also referred to as a leaf node. In addition, the annotation associated with each branch identifies context information for one of the branch or for the child nodes to which the branch is connected to. For example, a branch 144 extending below statement node 108 is connected to '=' assignment operator node 116 and annotated with main annotation 144, indicating it is a main branch off of statement node 108. Meanwhile, a branch 146 extending below statement node 108 as annotated with an rgannoAfter annotation 136, indicating the leaf nodes (whitespace node 120 and newline node 110) are used to provide whitespace and newline formatting information that follows statement 102a. Similarly, the rgannoBefore annotation 138 for a branch 148 extending below the '=' operator node 116 indicates that whitespace node 122 is used to define formatting comprising a range of zero or more whitespace characters before the '=' assignment operator in statement 102a, and the rgannoBefore annotation for a branch 150 extending below 'A' operand node 115 indicates that whitespace node 124 is used to define formatting comprising a range of zero or more whitespace characters before the 'A' operand in statement 102a.

The exprFirst annotations and exprSecond respectively identify first and second expressions in a portion of a statement including multiple expressions. For example, operand 'A', as identified by the exprFirst annotation 140 of a branch 148 extending below '=' assignment operator node 116 is a first expression relative to the '=' assignment operator of statement 102a, while the exprSecond annotation 142 for a branch 152 extending below '=' assignment operator node 116 to '+' operator node 117 indicates the '+' operator as a second expression that follows the '=' assignment operator in statement 102a. Similarly, the exprFirst and exprSecond annotations for the branches extending below '+' operator node 117 to 'B' operand node 118 and 'C' operand node 119 respectively indicate that the 'B' operand is a first expression before the '=' assignment operator and the 'C' operand corresponds to a second expression after the '=' assignment operator in statement 102a.

Tree 100a also depicts GUID indexes 103 having various integer values that are illustrated adjacent to respective nodes. (For illustrative purposes, the GUID indexes shown herein are arbitrary.) In one embodiment, each index is associated with a respective GUID, which may typically comprise an alphanumerical string or numerical value. As an option, GUIDs may be directly associated with nodes without using indexes. As discussed above, addition information could be associated with each GUID, such as the creator of the statement from which the node is derived and/or a timestamp identifying when the statement (and node) was created and/or when a version of the source code including a new node was first saved. Such additional information may be employed for various purposes, such as version control, code auditing, etc.

Figure 1B:
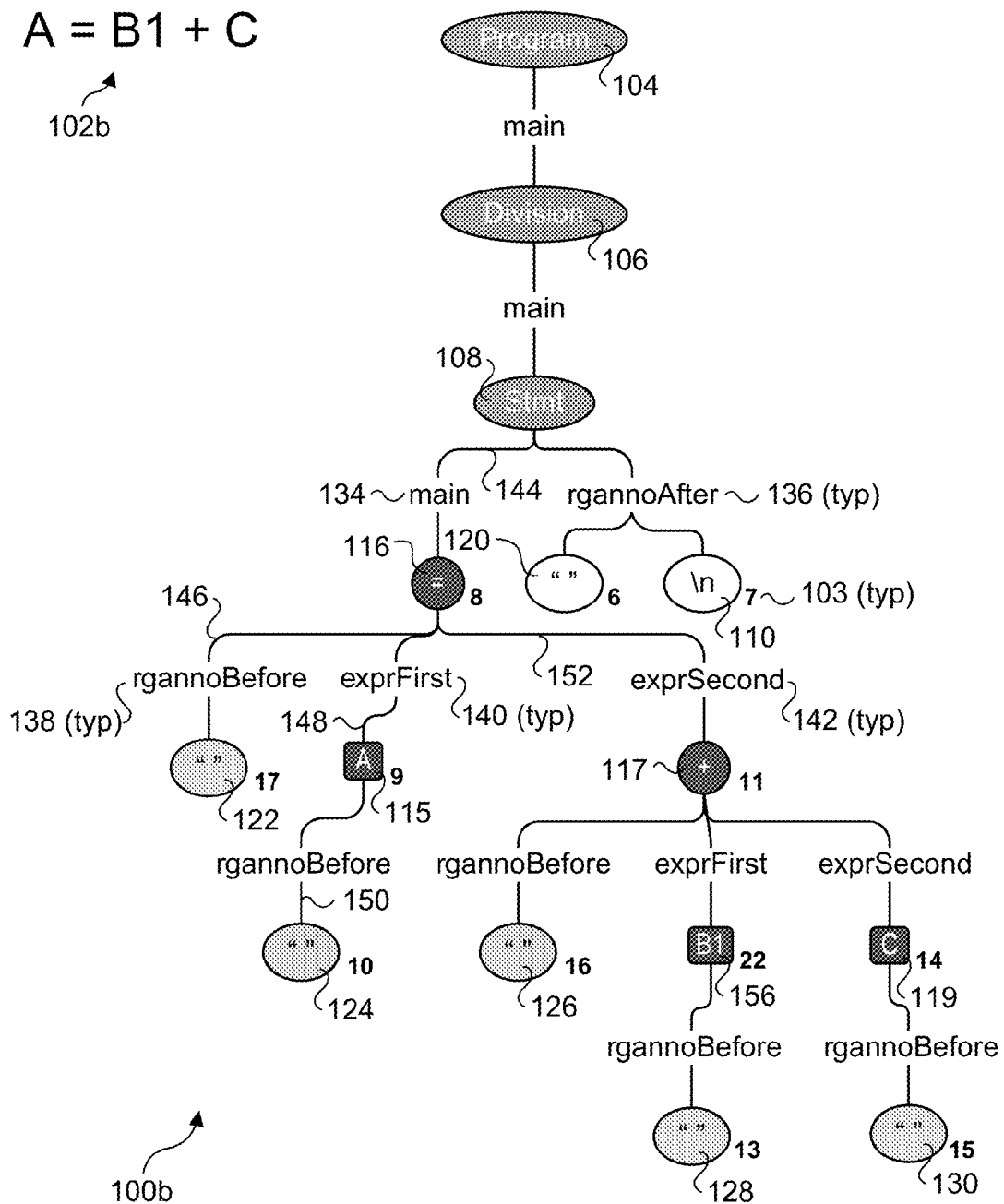
FIG. 1b is a diagram of a structure tree representation of a source code statement "A=B1+C", according to one embodiment.

FIG. 1b shows a tree 100b after statement 100a of FIG. 1a has been modified by renaming operand 'B' as "B1", as depicted by a statement 102b. As further illustrated, renaming the operand results in 'B' operand node 118 being replaced with a new "B1" operand node 156 having a new GUID index of "22", while the rest of tree 100b is the same as tree 100a.

Figure 2:
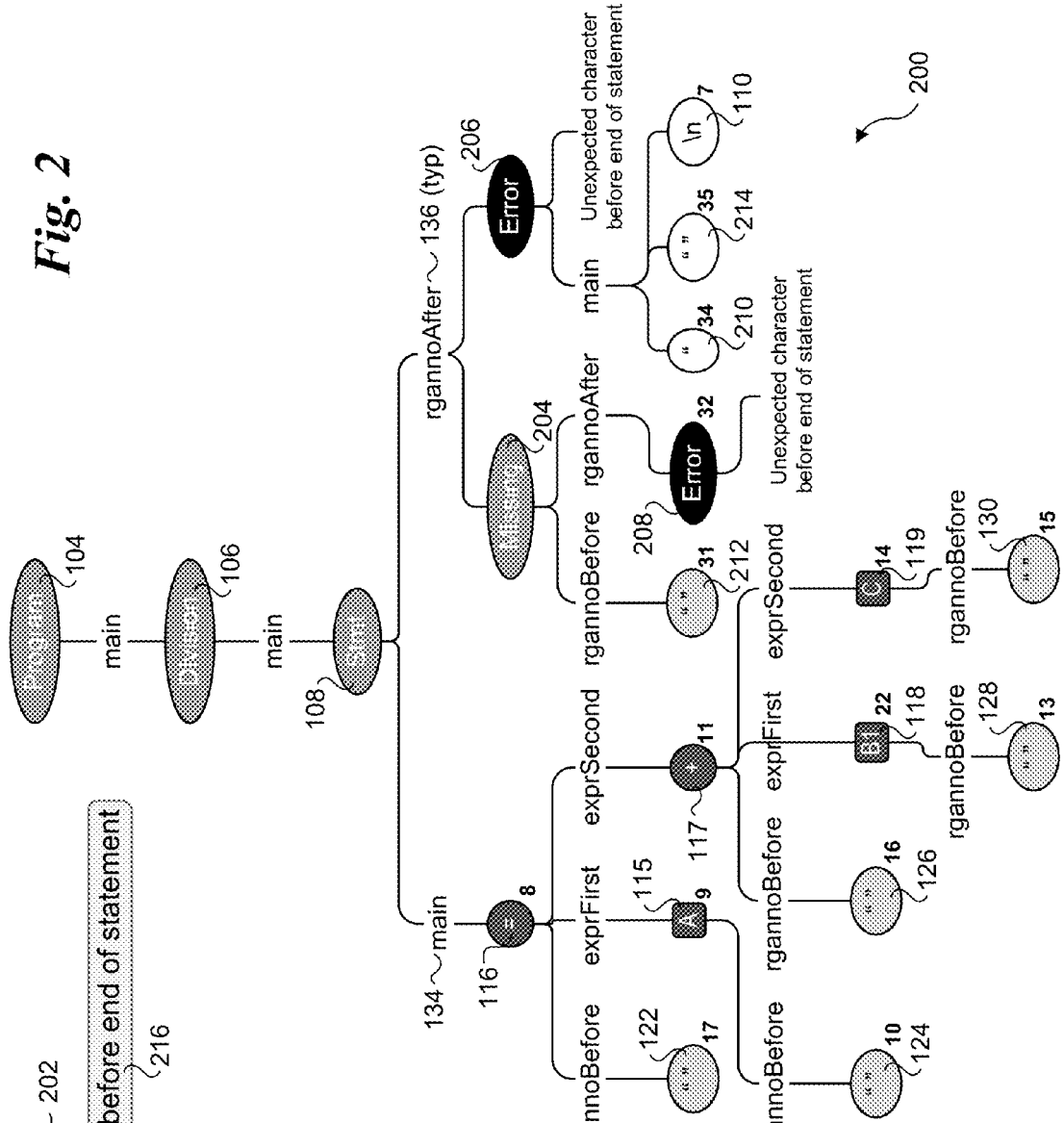
FIG. 2 is a diagram of a structured tree representation of a source code statement that includes an unexpected character before the end of the statement, according to one embodiment.

FIG. 2 shows a tree 200 corresponding to a statement 202 after a "(single quote) character has been added to the statement "A=B+C". This statement is detected to be an errant statement, as the single quote "is an unexpected character before the end of the statement. Upon detection of this condition, several nodes are added to tree 200 (relative to tree 100a of FIG. 1a) including a "missing" node 204, "Error" nodes 206 and 208, a "(single quote) character node 210, and whitespace nodes 212 and 214. As discussed above, a "missing" node is an example of a syntactic sugar node (s-node). In this example, "missing" node 204 indicates that something (the single quote character") was encountered before the statement was closed. Each of "Error" nodes 206 and 208 has a respective branch that is connected to a leaf node that stores the text string "Unexpected character before end of statement" (or otherwise may store a pointer to such a string). In one embodiment, the editor displays some type of indicia identifying a warning or error is detected, such as a warning message 216 stating "Unexpected character before end of statement." Optionally, the editor may indicate that character "appears to be errant by underlining it with a squiggly line in a particular color (e.g., red), or via others means common to various existing editors.

Figure 3:
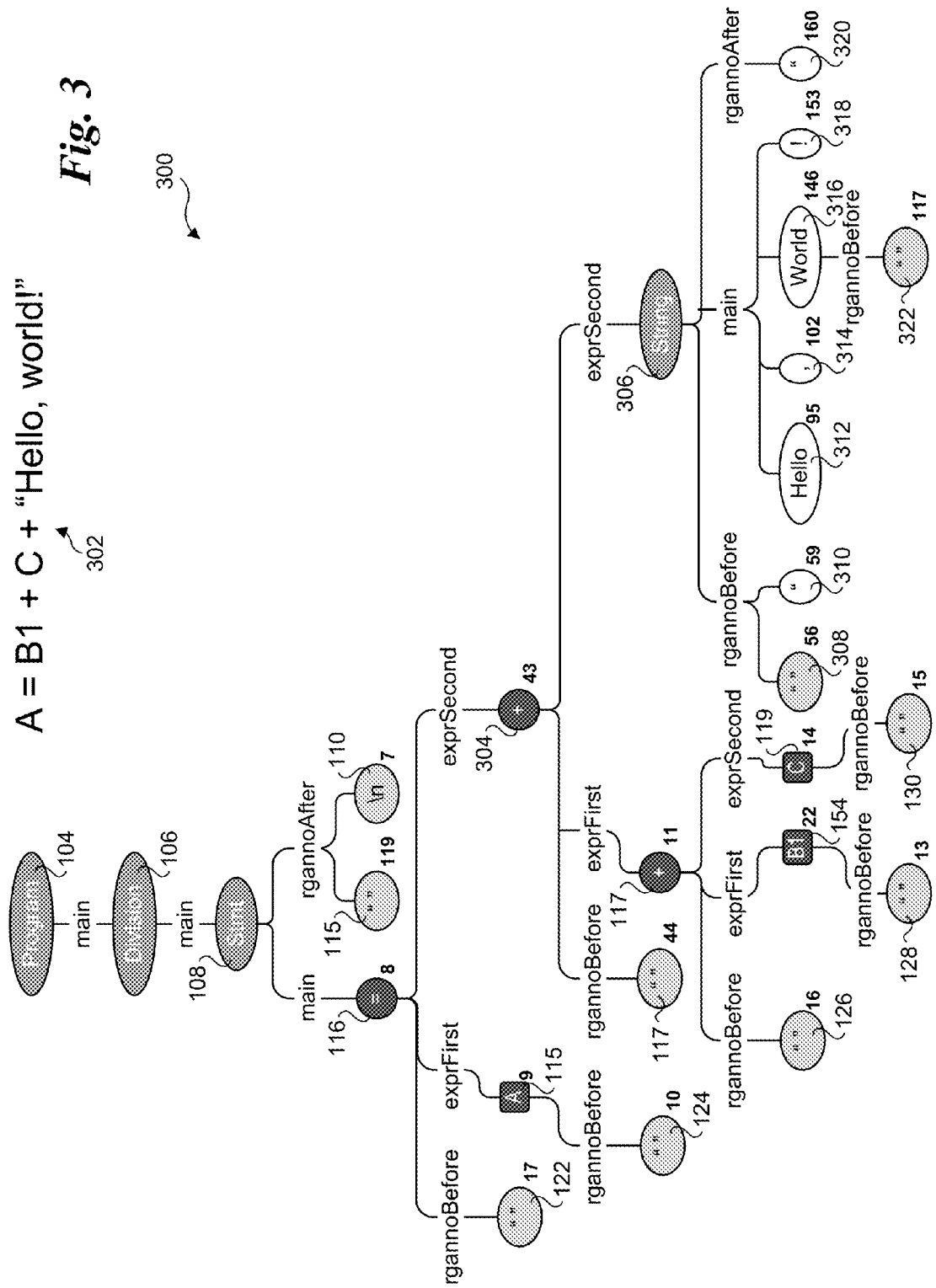
FIG. 3 is a diagram of a structured tree representation of a source code statement including a string, according to one embodiment.

FIG. 3 shows a tree 300 corresponding to a statement 302 in which "+"Hello, world!"" has been added to statement 102a of FIG. 1a. Tree 300 includes the following new nodes: a '+' operator node 304, a string node 306, a whitespace node 308, "character nodes 310 and 320, a "Hello" text node 312, a ',' character node 314, a "World" text node 316, a '!' character node 318, and a whitespace node 322. As further illustrated, '+' operator node 304 is added as a second expression under '=' assignment operator node 116, resulting in the node structure corresponding to "B1+C" (including proceeding and following whitespace) to be pushed down a level in the node hierarchy.

Figure 4:
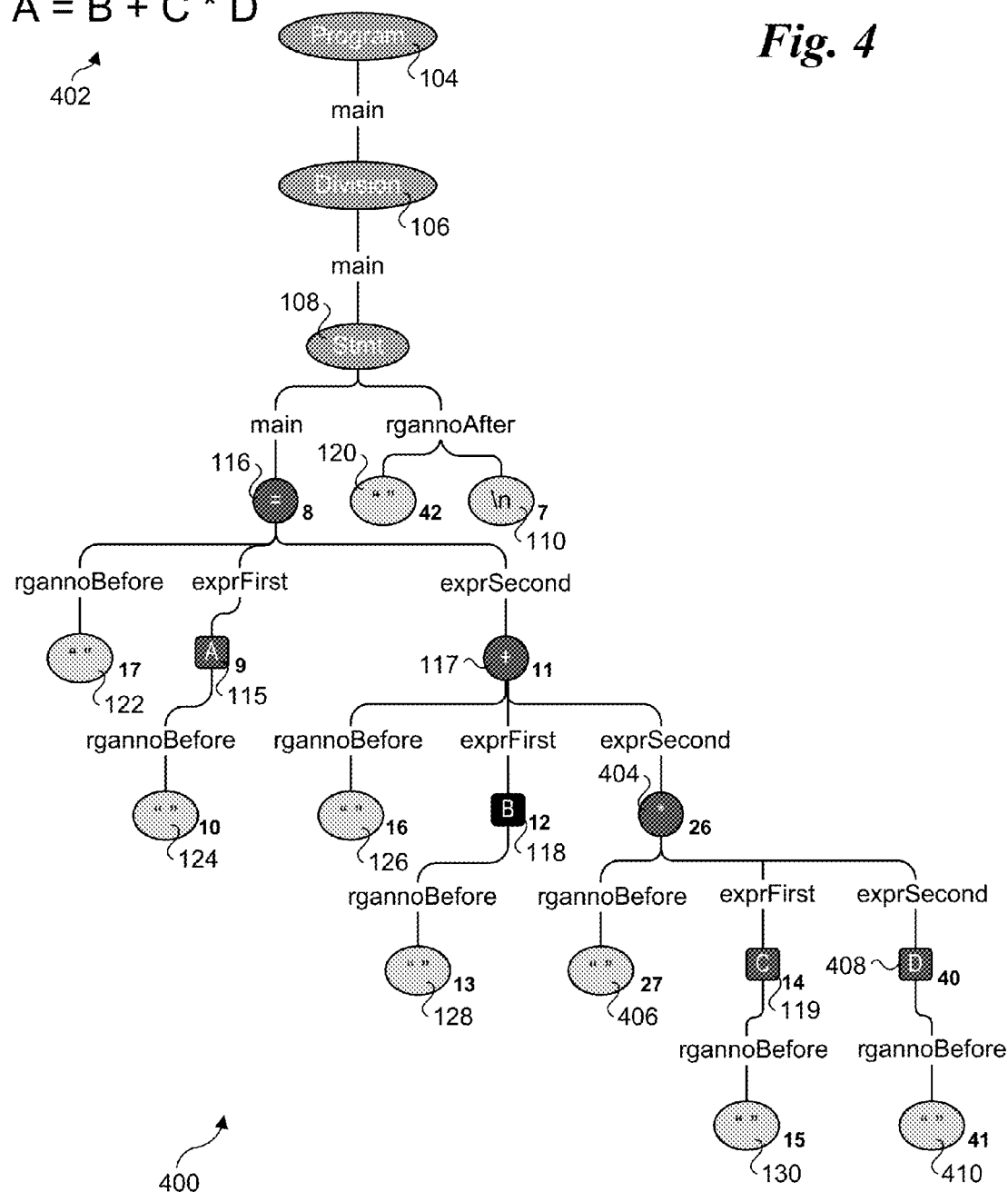
FIG. 4 is a diagram of a structured tree representation of a source code statement "A=B+C*D", according to one embodiment.

FIG. 4 shows a tree 400 corresponding to a statement 402 of "A=B+C*D". This corresponds to the statement 102a of FIG. 1a plus the addition of "*D", including surrounding whitespace. As shown toward the lower right portion of FIG. 4, the new nodes include a '*' operator node 404, whitespace nodes 406 and 410, and a 'D' operand node 408.

Figure 5:
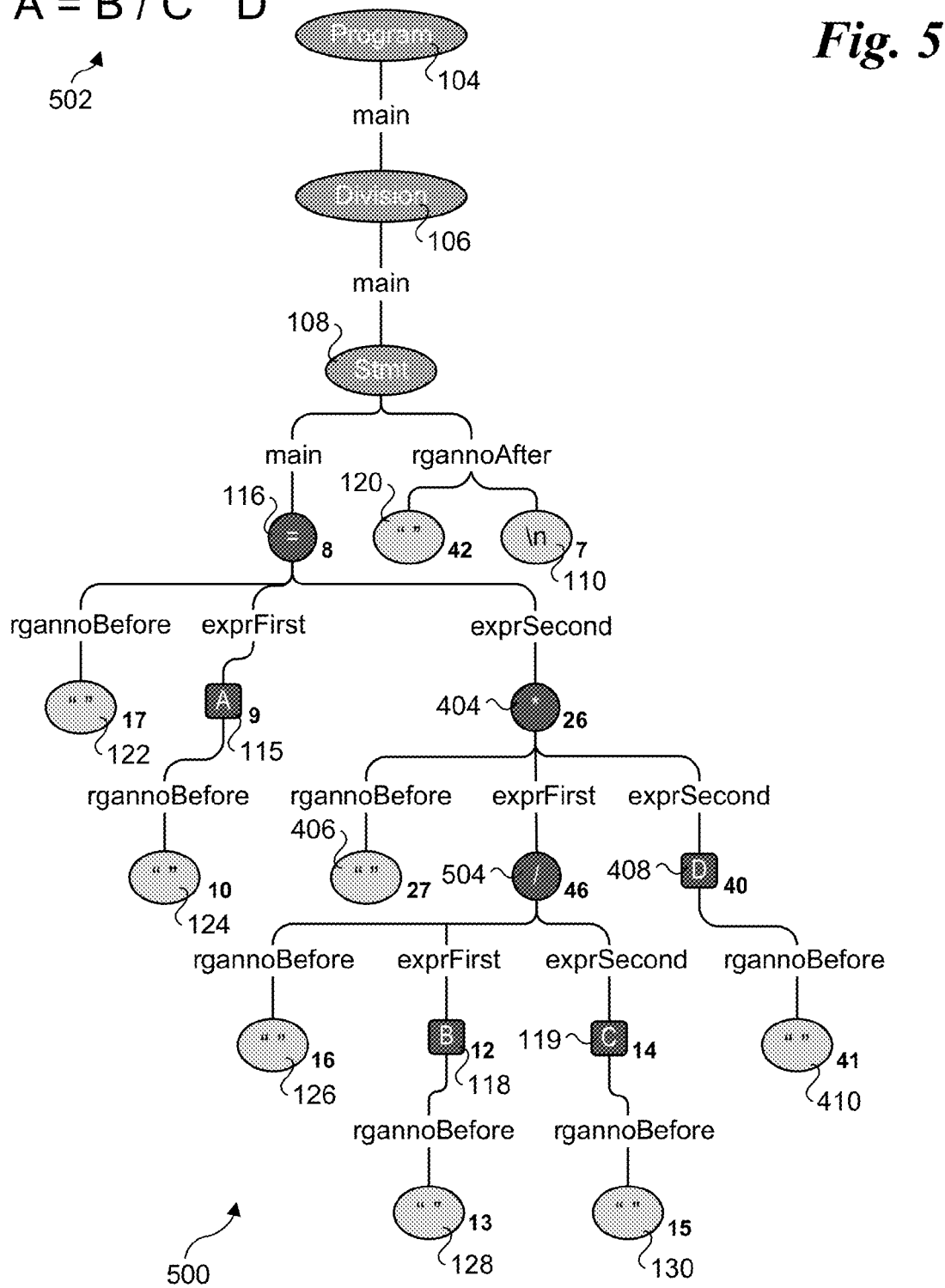
FIG. 5 is a diagram of a structured tree representation of a source code statement "A=B/C*D", according to one embodiment.

FIG. 5 shows a tree 500 corresponding to a statement 502 of "A=B/C*D", which was produced by replacing the '+' operator in statement 402 with a '/' operator. The only new node in tree 500 is a '/' operator node 504; however, comparison between tree 500 and tree 400 indicates that the '+' operator node 117 is not simply replaced with a '/' operator node. Rather, due to relative operator precedence and associativity of '+','*', and '/' operators, the node structure of tree 500 is restructured.

Figure 6:
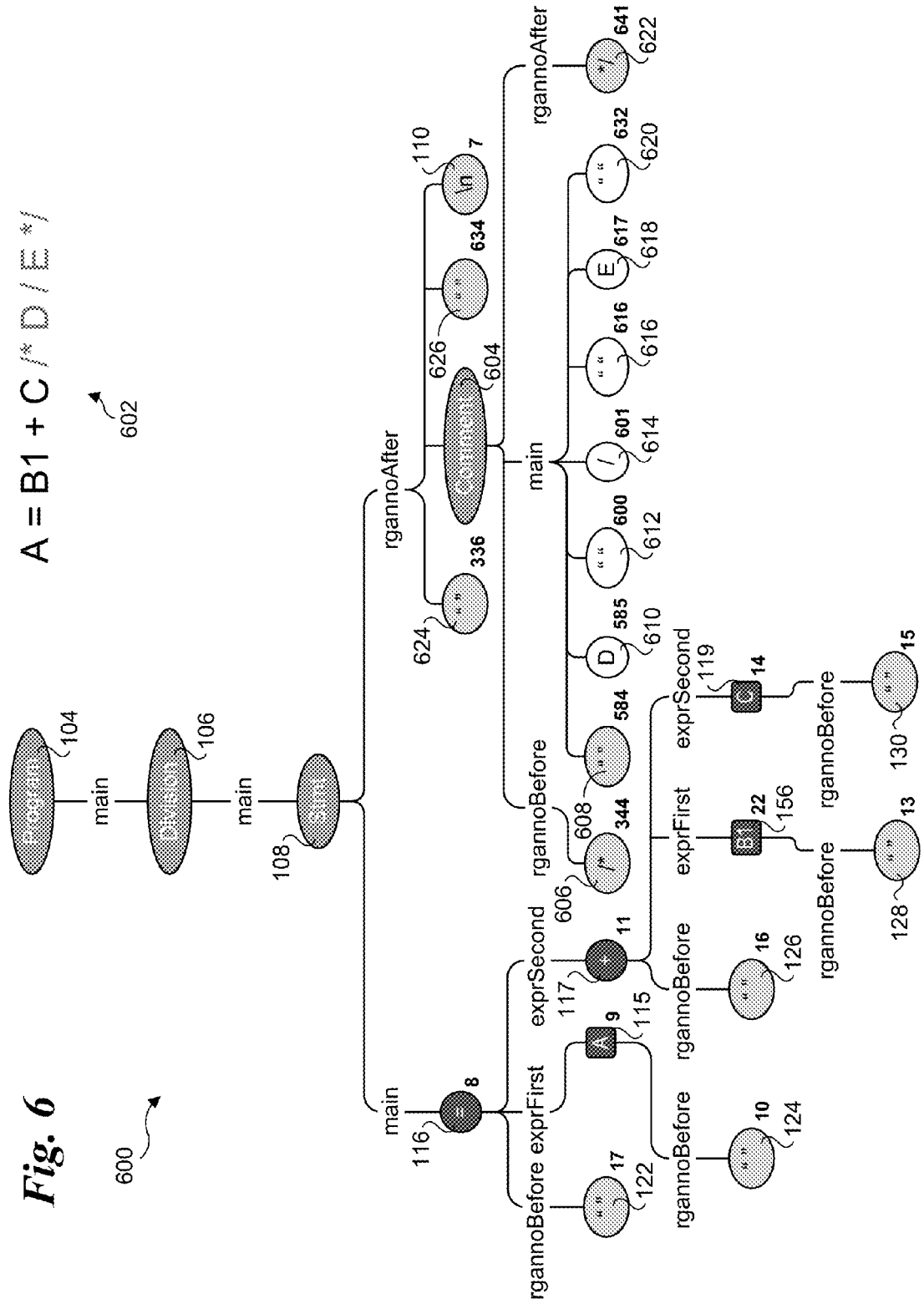
FIG. 6 is a diagram of a structured tree representation of a source code statement including a comment, according to one embodiment.

FIG. 6 shows a tree 600 corresponding to a statement 602 of "A=B1+C/*D/E*/", where the "/*D/E*/" portion of statement 602 corresponds to a comment as defined by respective start and end comment delimiters "/*" and "*/", such as used by many common languages including C, C++, C#, and Java. Accordingly, tree 600 includes a comment node 604 from which three branches (respectively annotated rganno-Before, main, and rgannoAfter) extend downward to various leaf nodes, including a "/*" start comment delimiter node 606, a whitespace node 608, a 'D' character node 610, a whitespace node 612, a '/' character node 614, a whitespace node 614, an 'E' character node 618, a whitespace node 620, and a "*/" end comment delimiter node 622. In addition, there are whitespace nodes 624 and 626 that are before and after comment node 604.

Figure 7:
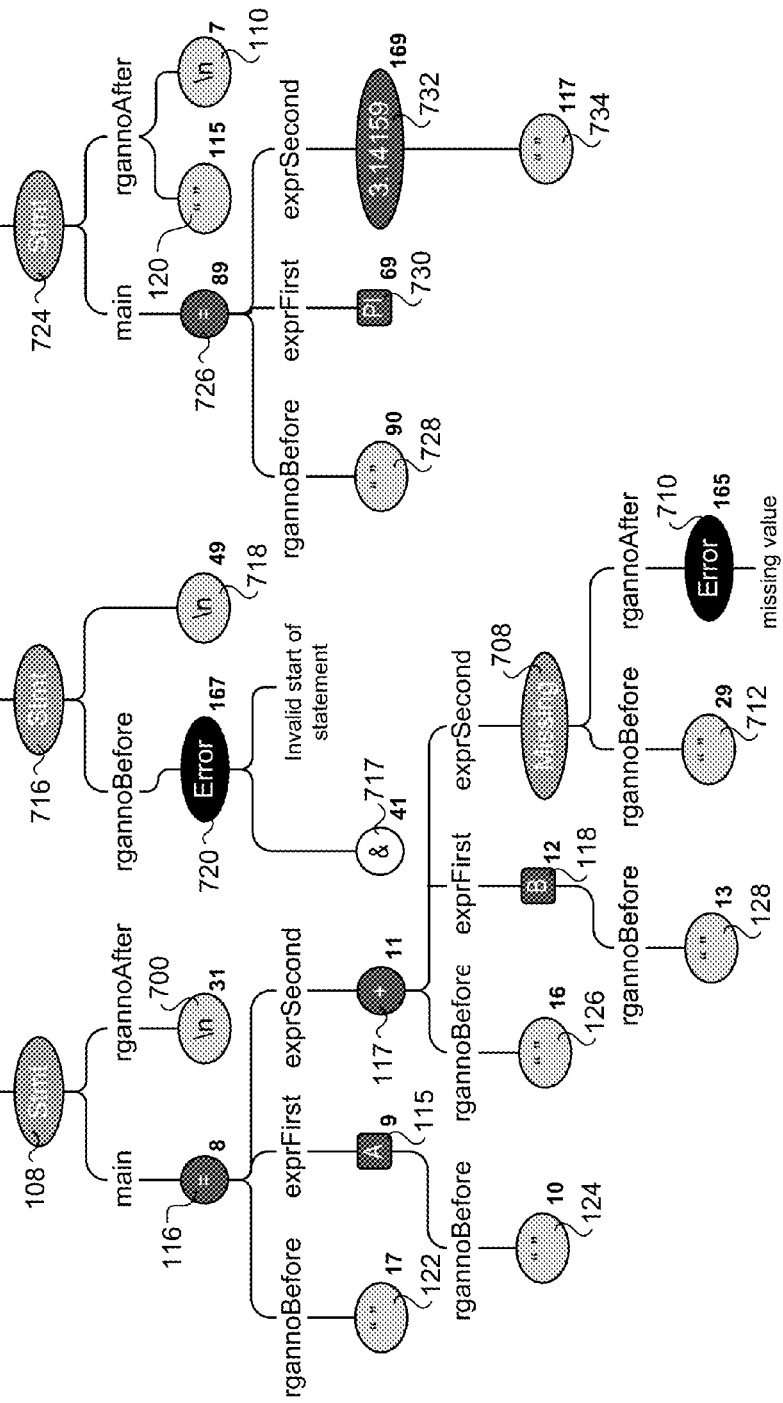
FIG. 7 is a diagram of a structured tree representation of source code statements that include errors, according to one embodiment.

FIG. 7 shows a tree 700 corresponds to three statements 702, 704, and 706. Statement 702 comprises "A=B+", which is an incomplete statement that results in generation of a missing s-node 708, an error node 710 indicating a "missing value" is detected, and a whitespace node 712. A "missing value" message 714 or other type of indicia may also be displayed via the editor. Statement 704 comprises a single '&' operator, which corresponds to an invalid start of a statement. When the '&' is entered via the editor, a statement node 716 is created and coupled the main branch of division node 106, and will initially include a branch extending downward to an '&' operator node 717 comprising a leaf node. When the user subsequently enters a carriage return (CR)), a newline node 718 is generated, along with an error node 720 that indicates an "invalid start of statement" error has been detected. An "invalid start of statement" message 722 or other type of indicia may also be displayed via the editor.

Statement 706 comprises "PI=3.14159" wherein "PI" is defined as a variable (or a literal) of one of types long, double, or float, and "3.14159" is a corresponding long, double, or float constant value that is assigned to "PI" via the '=' assignment operator. As before, the entry of any new statement generates a statement node, as depicted by a statement node 724. The nodes below statement node 724 include an '=' assignment operator node 726, a whitespace node 728, a "PI" variable or literal node 730 (as applicable), a "3.14159" constant node 732, and a whitespace node 734.

FIG. 8 shows a tree 800 corresponding to a statement 802 of "A="B+C", where a leading single quote" has been added before operand 'B'. Upon detection of the single quote, the editor anticipates the user desires to enter a string. This results in generation of a string node 804. It also converts the 'B' and 'C' operands in tree 100a of FIG. 1a into respective 'B' and 'C' character nodes 806 and 808, and adds a single space node 810 and a single quote node 812. Ultimately, if the user desired to enter a string the string would include a second trailing single quote to close the string. However, at this state, only the leading single quote exists, resulting in detection of an unclosed string error, which also results in generation of a missing S-node 814 and an error node 816 indicating an unclosed string has been detected. An "unclosed string" error message 818 is also displayed under statement 802 in the editor.

As discussed above, in addition to supporting editing of text-based source code, the editor supports used of extended representations of operands and/or tokens, such as operands corresponding to images, video, audio or other non-text content. In one embodiment, an iconic representation and/or an editable text string that is editable only as a whole and that is associated with a single operand of extended representation is used, such as illustrated in FIGS. 9a and 9b.

Figure 9A:
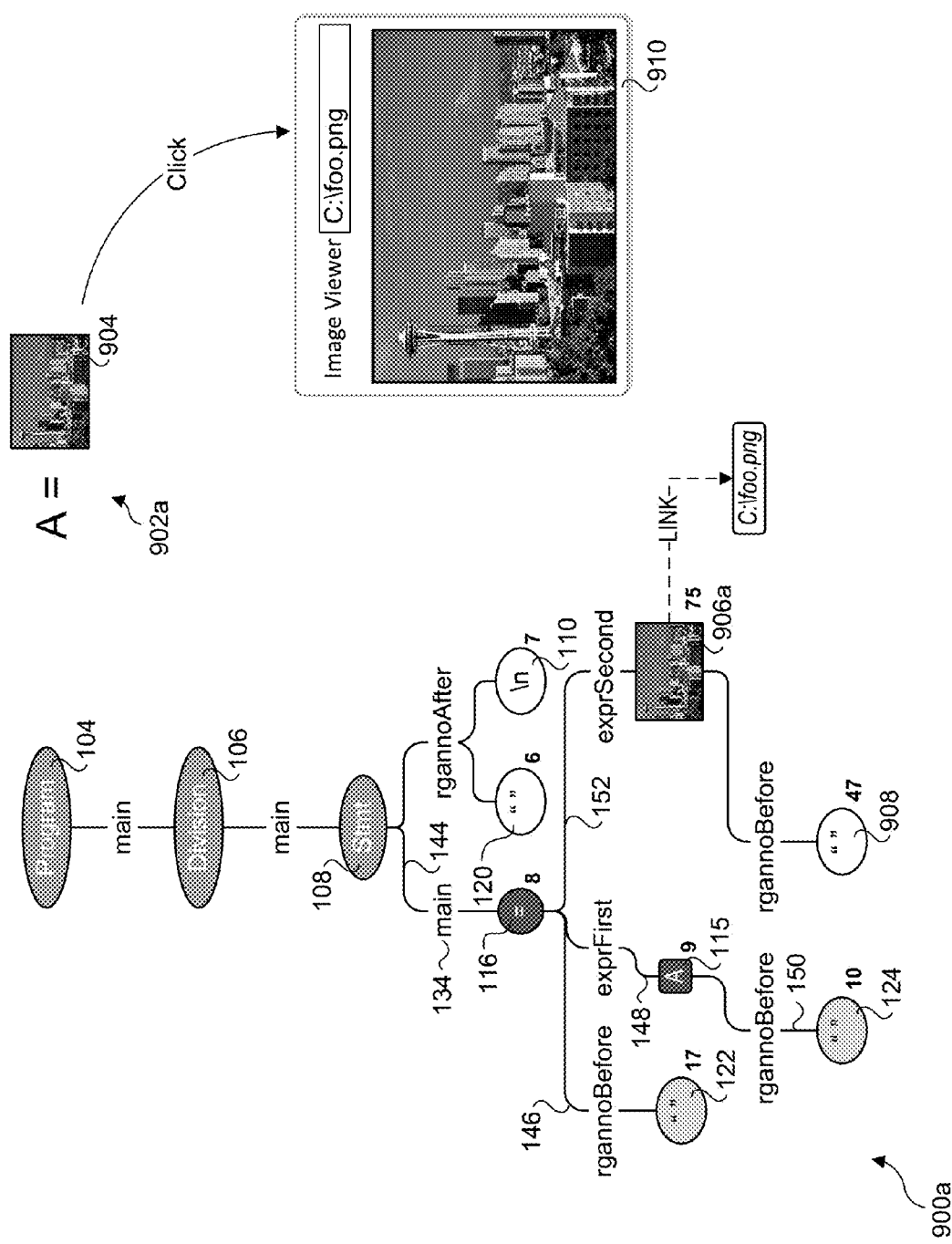
FIGS. 9a and 9b are diagrams of a respective structure tree representations of a source code statement that includes a token of extended representation corresponding to an image, according to respective embodiments.
Figure 9B:
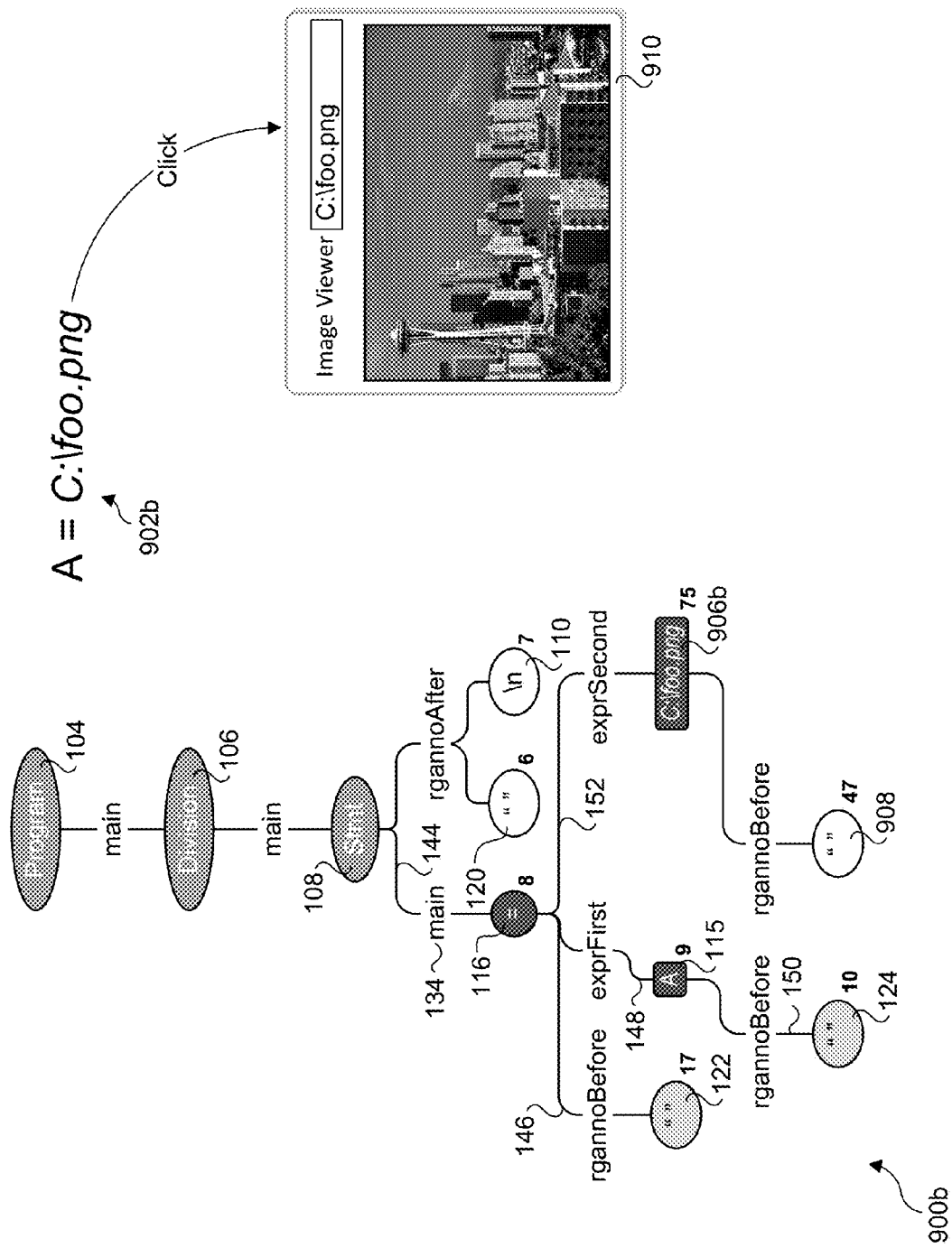

In further detail, FIG. 9a depicts a tree 900a corresponding to a statement 902a of "A=[image thumbnail] operand of extended representation 904, wherein the image thumbnail is of an image comprising an operand of extended representation. In addition to image thumbnails, an operand of extended representation may be depicted in the editor as an icon (e.g., an image, video, or audio icon), or an image corresponding to the frame of a video, or as a string editable only as a whole. In tree 900*a*, the new nodes include a node 906*a*, along with a single space node 908. Node 906*a* will include one or more attributes that associate the node with a corresponding extended representation.

In one embodiment, a operand of extended representation is linked to a locator of an instance of the operand of extended representation, such as a string comprising a URL identifying where the operand of extended representation is located, e.g., "C:\foo.png", which indicates an image file named "foo.png" is located in the "C:\" root folder of a local machine running the editor. Optionally, an operand of extended representation may only exist in the structured tree representation itself. For example, the operand of extended representation image, video, audio, or other file may be added as a resource or the like via the editor's user interface (not shown), which results internally in generation of an applicable thumbnail or icon, along with associated attributes. As show in FIG. 9*b*, as an option, the extended representation of the operand may be depicted in a statement using a URL, such "C:\foo.png" shown in statement 902*b*, wherein the text of the URL is italicized to identify it as an extended representation of the operator rather than a text string. In tree 900*b*, the new nodes include node 906*b* of extended representation that stores a URL for the image file, along with single space node 908. As further illustrated, in one embodiment the programmer may perform a user input to either image thumbnail 904 in FIG. 9*a* or "C:\foo.png" in FIG. 9*b*, such as clicking or double-clicking on it, or right-clicking to pop up a pull-down context menu to cause the image to be retrieved and displayed, such as depicted in an image viewer 910.

Figure 10:
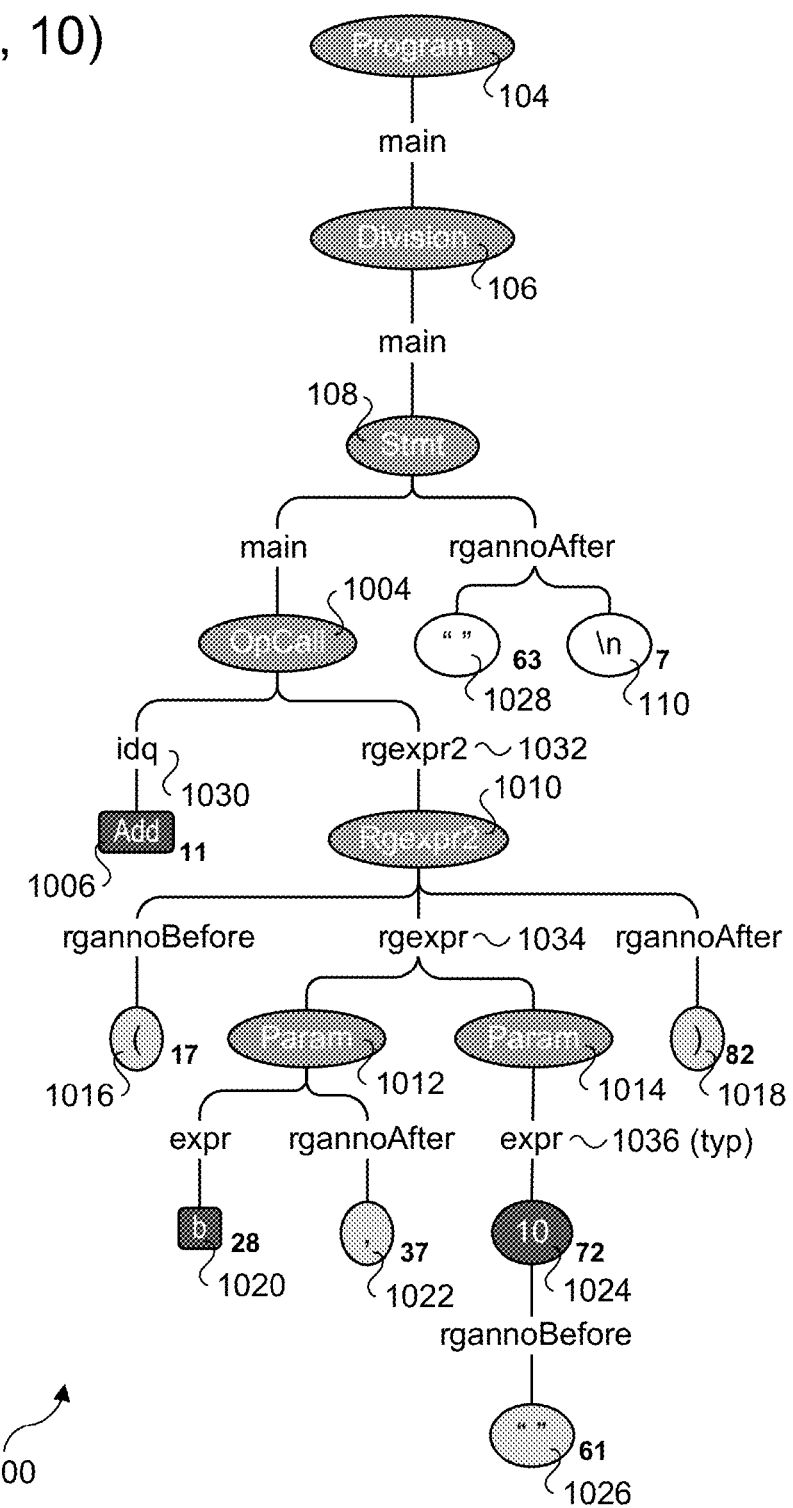
FIG. 10 is a diagram of a structured tree representation of a source code statement corresponding to a function call, according to one embodiment.

FIG. 10 illustrates a tree 1000 corresponding to an example of how a function call depicted by a statement 1002. The function call is to a function named "Add", with two parameters 'b' and 10. In connection with recognition that statement 1002 is a function call, an OpCall node 1004 is generated, along with an "Add" function name node 1006. An Rgexpr2 (range of expressions) node 1010 is generated, which represents the root of a new tree section corresponding to the function's parameters. This new tree section includes parameter nodes 1012 and 1014, an open parenthesis '(' character node 1016, a close parenthesis ')' character node 1018, a 'b' variable node 1020, a comma ',' character node 1022, a 10 parameter value node 1024, and a single space node 1026. Another single space node 1028 is added after statement node 108. Branch annotations that are new to tree 1000 include an "idq" (qualified identifier (ID)) annotation 1030, a "rgexpr2" (range of expression) annotation 1032, a "rgexpr" annotation 1034, and an "expr" (expression) annotation 1036. "rgexpr" annotation 1034 identifies the children of an Rgexpr2 node that represent expression (as distinguished from children categorized as rgannoBefore or rgannoAfter).

Figure 11:
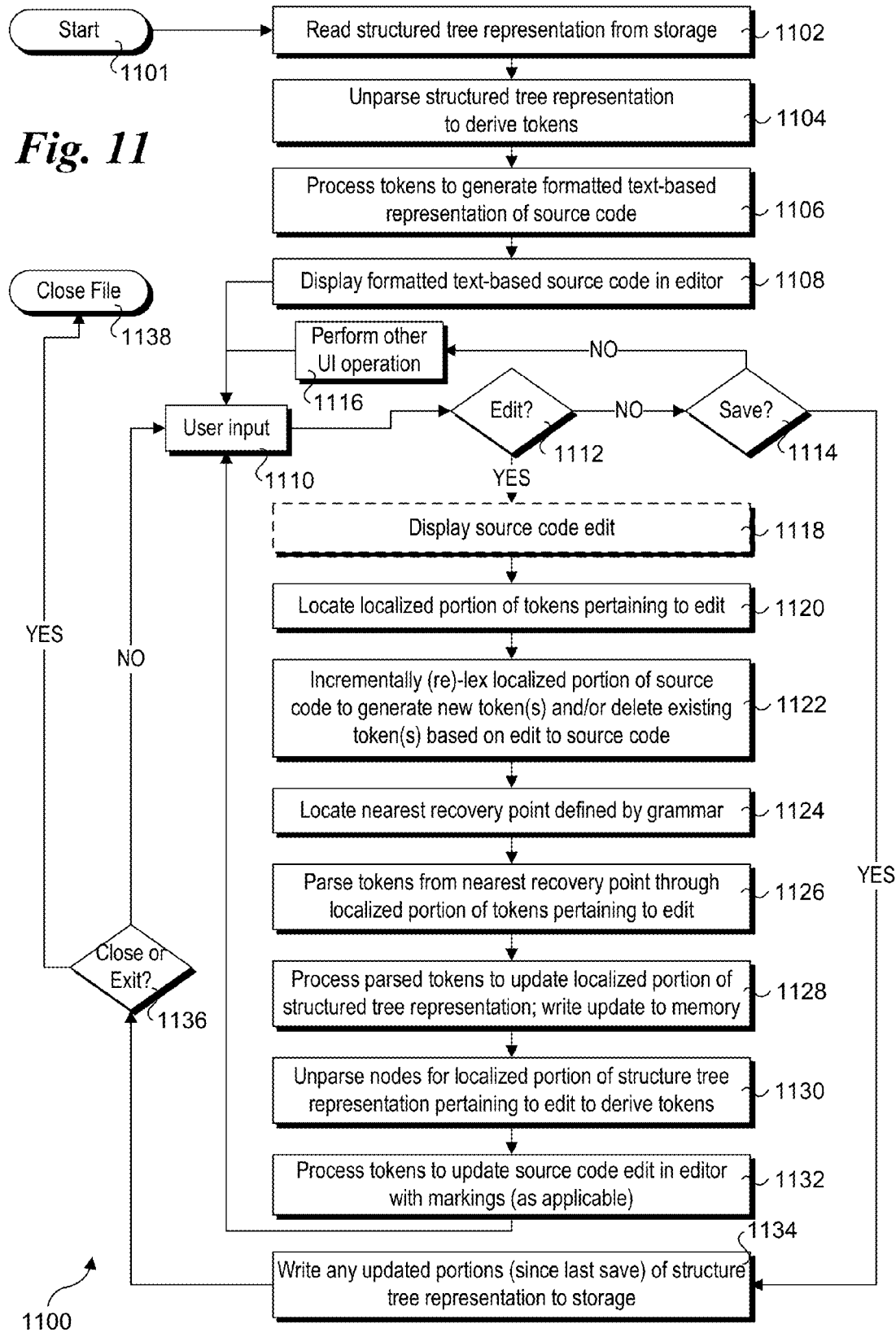
FIG. 11 is a flowchart illustrating operations and logic for supporting real-time interactive editing of source code using a continuous loop, according to one embodiment.

As discussed above, as the user edits the text-based source code, an ongoing loop in implemented that unparses an applicable portion of the tree (corresponding to the text-based source code being edited), the text is enabled to be edited in the conventional manner, causing new tokens to be generated, which are then parsed to generate an updated structured tree representation including applicable new and/or deleted nodes. Further details of this process are depicted in a flowchart 1100 of FIG. 11 and the process flow examples illustrated in FIGS. 12 and 13.

Flowchart 1100 illustrates operations and logic for implementing and operating an editor in accordance with selected aspects of the embodiments disclosed herein. In this example, the source code for an existing program or module is being opened in edited; similar operations are performed for editing new programs or modules. The process begins in a start block 1101 and proceeds to a block 1102 in which the structured tree representation (which is stored as one or more files) for an existing program or module is read from storage, such as from a local disk, accessed via a local network, or accessed via a remote network. In the case of a new program or module, a starting structured tree representation is read from storage, such as depicted by tree 100 of FIG. 1.

In a block 1104, the structured tree representation is unparsed to derive the tokens. As discussed above, this is performed by an "unparser" that creates a linear string of tokens from a (sub)tree of nodes. This is performed by recursively inspecting the nodes, outputting the non-parsed information before, outputting the program statement elements appropriately interspersed with syntactic sugar, then outputting the non-parsed information after. The tokens are then processed in a block 1106 to generate a formatted text-based representation of the source code, which is then displayed via the editor in a block 1108. From the perspective of the user, the operations of blocks 1102, 1104, 1106, and 1108 appear as if the user is opening an existing text-based source code file for editing in a conventional manner. Notably, in contrast to storing the source code in a text-based file, the source code is stored via the structured tree representation. As an option, a text-based version of the source code may also be stored and accessed to facilitate immediate editing of larger files. However, the primary means for storing and accessing the source code is the structured tree representation.

The remaining portion of flowchart 1100 pertains to an ongoing loop that is continuously performed to facilitate real-time interactive editing of the source code (and storing updated versions of the source code as a structured tree representation). In a decision block 1110, a user input (UI) is received. In response, in a decision block 1112 a determination is made to whether the user has entered input to edit a portion of source code displayed via the editor. If the answer is NO, the logic proceeds to a decision block 1114 in which a determination is made to whether the user input is a request to save the source code being edited. If the answer is NO, the logic proceeds to a block 1116 in which other operations pertaining to the user input are performed. For example, a user input may be to perform various conventional editor operations, such as navigation (e.g., scrolling), search operations, inspection operations, etc. Upon completion of the operation in block 1116, the logic returns to block 1110 to receive the next user input.

If the user input is an edit, the answer to decision block 1112 is YES, and the logic proceeds to an optional block 1118 in which the source code edit is immediately displayed. From the user's perspective, edits are immediately reflected in real-time, and the user is unaware of processing that is going on behind the scenes to implement the edit. For many types of edits, the edited source code will be immediately displayed in block 1134 discussed below, and block 1118 is skipped. However, if there is a large amount of source code that is added via a paste operation from another file, the processing of this added source code may not be able to be performed on a real-time basis such that the user experience is compromised, and thus it is preferable to immediately display the edit and then redisplay the edit (as applicable) after the corresponding portion of the structure tree representation has been generated and tokens are unparsed in block 1134.

Next, in a block 1120, the localized portion of the structured tree representation pertaining to the edit is located. For example, each statement (or logical group of statements) will have a given location in the overall structured tree representation, which can be readily determined based on the tokens corresponding to the text content being edited. In response to the edit, an incremental re-lexing of the localized portion of source code is performed 1122, which will generate one or more new token(s) and/or delete one or more existing token(s), in accordance with the particular text edit to the source code. This involves a lexical analysis of the portion of the source code that is edited, which generates/deletes the applicable tokens. For cases where source code is pasted in from another file, an initial lexical analysis of the pasted in source code will be performed.

In a block 1124 the nearest recovery point defined by the grammar is identified. The tokens are then parsed from this nearest recovery point through the localized portion of the tokens pertaining to the edit in a block 1126 (including any new and/or deleted tokens), and the parsed tokens are processed in a block 1128 to update the localized portion of the structured tree representation, generating new nodes and tree structure and/or deleting existing nodes and tree structure, as applicable This update is then written to memory, thus revising the current version of the structured tree representation for the source code file that is being edited.

In a block 1130, nodes corresponding to the updated localized portion of the structured tree representation are unparsed to derive tokens, which and are subsequently processed in a block 1132 to display the updated source code edit within the editor. If errors are detected, appropriate markings and/or other indicia are presented by the editor. The logic then returns to block 1110 to detect the next user input, starting the loop over again.

Returning to decision block 1114, if the user input is a save request, the answer to the decision block is YES, and the logic proceeds to a block 1134 in which any portions of the structured tree representation that have been updated since the last save operation are written to the storage location for the file. It is noted that periodic saves may also be performed automatically based on a user setting or the like. As depicted by a decision block 1136, if the save request is in connection with a request to close the file or exit the editor, the file is closed in an exit block 1138.

The operations of the blocks 1110, 1112, 1114, 1116, 1118, 1120, 1122, 1124, 1126, 1128, 1130 and 1132 are performed in a continuous loop-wise manner to support real-time interactive editing of the source code. Significantly, in response to each edit there is a sequence of operations that results in generation of new and/or deleted tokens that are parsed to generate an updated version of the structure tree representation, which, in turn, is unparsed to display an updated version of the text-based source code in the editor, including any error markings, as applicable. At the same time, there is no updating of a source code text file in memory, as the primary representation of the source code is stored in the structure tree representation rather than a text-based file, as is employed by conventional IDE editors.

Figure 12:
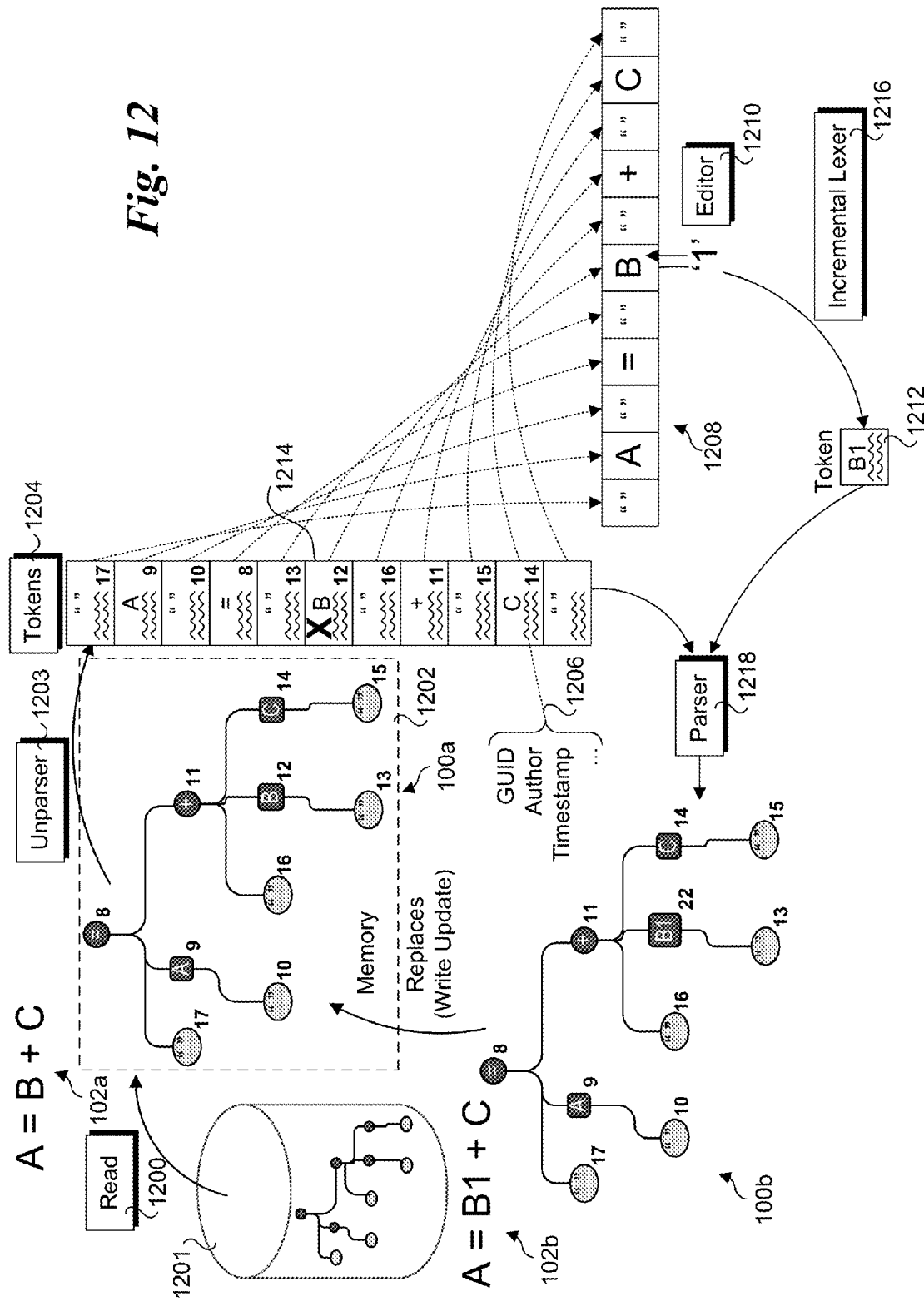
FIG. 12 is a diagram illustrating loop operations performed to support editing the source code statement of "A=B+C" to "A=B1+C", according to one embodiment.

FIG. 12 graphically illustrates implementation of the operations of flowchart for a simple text edit under which the 'B' operand in statement 102*a* of "A=B+C" is replaced with "B1", resulting in statement 102*b* of "A=B1+C." In connection with opening a file containing source code including statement 102*a* for editing, a read operation 1200 is performed to read the structured representation of the source code from storage 1201 into memory 1202. For simplicity and clarity, only the structured representation of statement 102, depicted as tree 100*a*, is shown in FIG. 12; it will be understood by those skilled in the art that tree 100*a* represents a relatively small portion of the overall structured representation for the source code in the file. For an editor that is implemented as a software application on a local machine, the entire source code file will typically be read into memory when the file is opened, noting that this is not limiting, as only a portion of a large file may initially be read under some embodiments. Generally, if the editor is implemented as a network- or Web-hosted software service, all or a portion of the source code may be initially loaded into memory on the application server. After being loaded into memory 1202, a tree 100*a* comprising a localized portion of the structured tree representation for the source code being edited corresponding to statement 102*a* is unparsed via an unparser 1203 to derive a set of tokens 1204.

Each token 1204 includes information corresponding to the text representation of the source code, such as an operand, an operator, a variable identifier, a formatting character, etc. Each token 1204 further includes information 1206 associated with the token, such as one or more of a GUID index, an identity of the programmer editing the source code, and a timestamp. In one embodiment a data structure is used to store information 1206, and the information included with the token is a pointer to its associated data structure, or optionally, an index to the pointer or data structure. Other schemes for linking data to objects (such as tokens) may also be used, as will be recognized by those skilled in the computer arts.

The textual and formatting information contained in tokens 1204 is extracted to display a formatted text string 1208 corresponding to statement 102*a* that is displayed within the editor. In response to the user changing operand 'B' to "B1" via an editor 1210, an incremental re-lexing of the updated formatted text string "A=B1+C" (including any whitespace characters) is performed in accordance with block 1122 of flowchart 1100 by an incremental lexer module 1216, resulting in a new token 1212 being generated, while an existing token 1214 for operand 'B' is marked as deleted.

Next, the set of tokens 1204 and token 1212 are parsed and processed via a parser module 1218, resulting in generation of tree 102*b* corresponding to the edited statement 102*a*. A comparison between trees 102*a* and 102*b* shows that operand node 'B' has been replaced with operand node "B1", while the rest of the tree remains the same. The updated structured tree representation information is then written back to memory, and the unparse, text display, edit, parse, update loop is started again to enable the next edit to be made.

Figure 13:
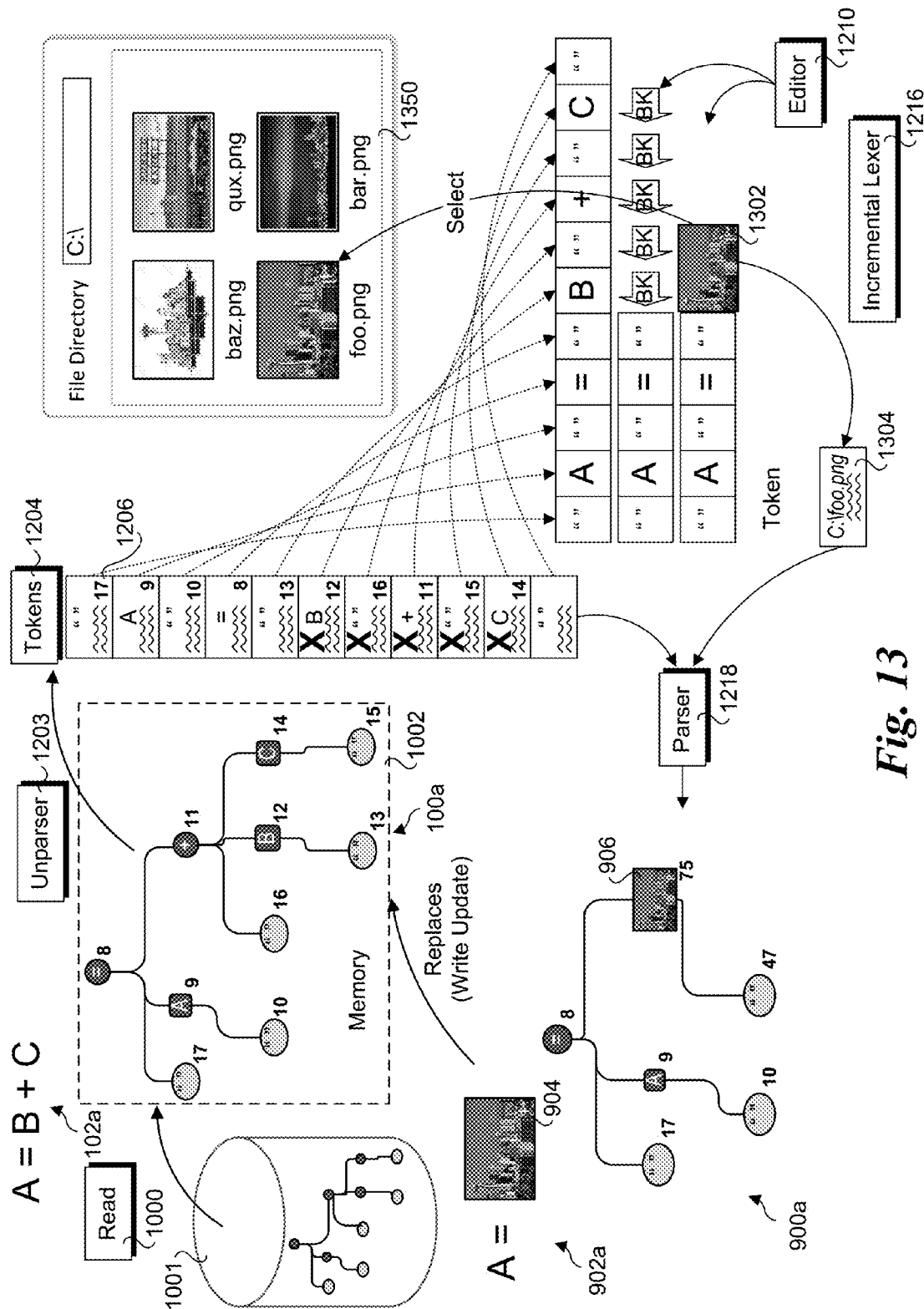
FIG. 13 is a diagram illustrating loop operations performed to support editing the source code statement of "A=B+C" to the source code statement of FIG. 9a, according to one embodiment.

FIG. 13 shows an example of a statement edit that begins with statement 102*a* of FIG. 1*a* and ends with statement 902*a* of FIG. 9*a*. As with FIG. 12, after loading the structured tree representation of the source code from storage 1201 into memory 1202, tree 100*a* corresponding to statement 102*a* is unparsed and processed to derive tokens 1204. The edit in this example replaces "B+C" with the thumbnail image for foo.png. In the illustrated embodiment this edit is accomplished by first backspacing five times, as depicted by backspaces (BK). Each time a backspace is entered, the loop would be processed in a similar manner to that described above for FIG. 12, resulting in removal of nodes and tokens for 'C', space " ", '+', space " ", and 'B' in order, as depicted by the "X" over five of tokens 1204. For simplicity this is depicted as a single result in FIG. 13. As an option, the user could simply select "B+C" and then enter delete or select delete or cut from a context menu (or via a key combination input), and a similar result would be accomplished, although in this case the loop would be performed once rather than five times. In either case, the edit is performed in real-time in an interactive manner that is unnoticeable to the user.

There are various means for enabling users to add operands of extended representation. In the illustrated embodiment, the user may select input of an operand of extended representation via a context menu or main menu option (both not shown) or a key combination, which will launch a dialog box containing a file directory via which the user can navigate and select an image, video, audio, or other type of file corresponding to the operand of extended representation the user desires to add to the source code. This is depicted as a file directory dialog 1350 in FIG. 13, and the user has selected "foo.png" from among a list of files in the C:\folder.

In response to the user selecting "foo.png", a thumbnail image 1302 is added to the statement, which now corresponds to statement 902*a*. A new token 1304 is created and provided as an input to parser 1218, which outputs tree 900*a* including node 906 corresponding to the operand of extended representation. In one embodiment, token 1304 includes a URL of C:\foo.png. In another embodiment, token 1304 includes other means for linking the token to the operand of extended representation's image. The updated tree 900*a* is then written to memory 1002 (replacing tree 100*a*), followed by unparsing of tree 900*a* to derive an updated set of tokens 1204 that are processed to display the updated statement 902*a* in the editor.

Figure 14:
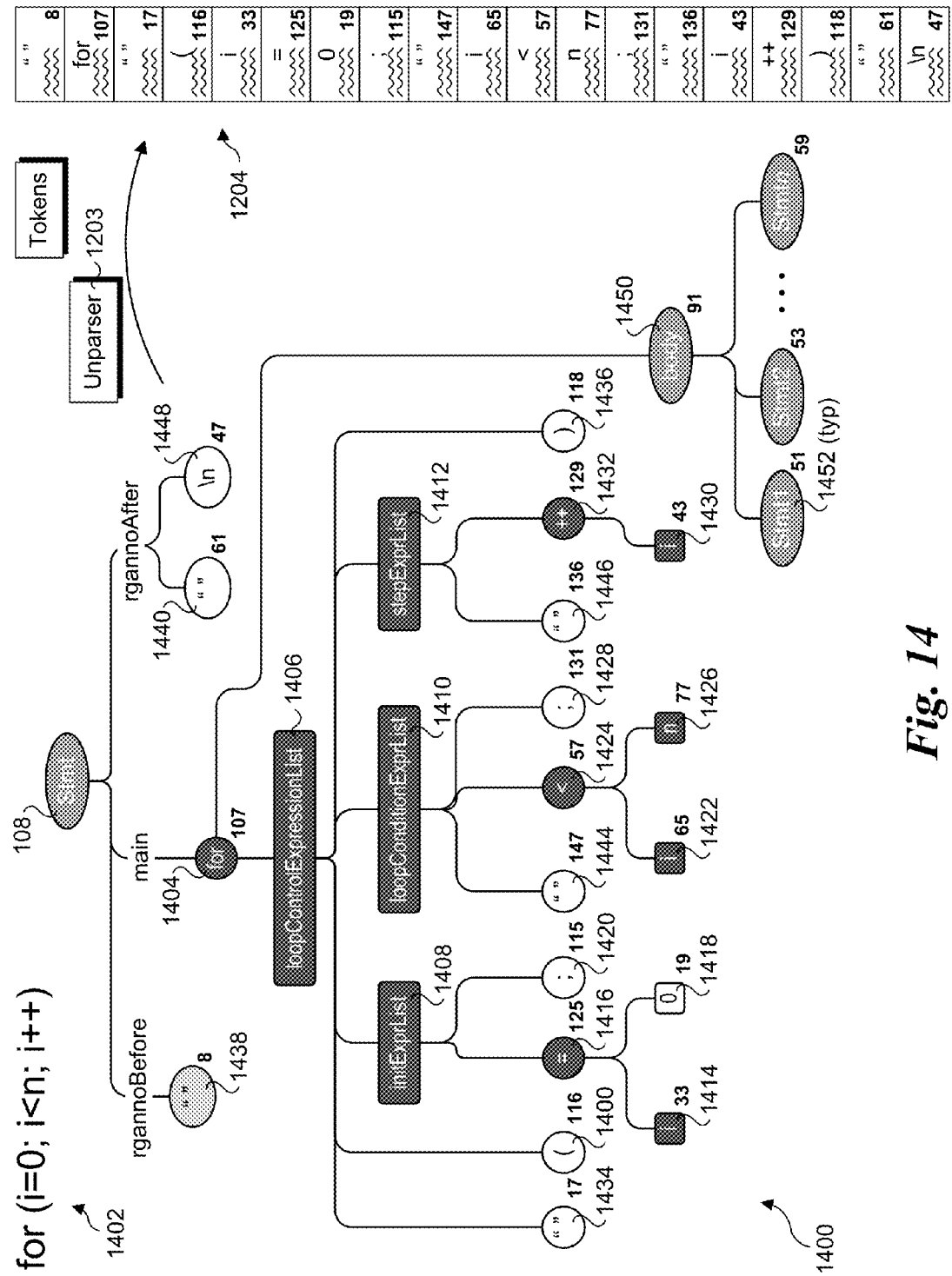
FIG. 14 is a diagram illustrating a structured tree representation of a source code statement corresponding to a for loop, according to one embodiment.

In accordance with further aspects of some embodiments, support for code flow control, such as looping, is provided. An example of a tree 1400 correspond to a "for" loop statement 1402 of "for (i=0; i<n; i++)" is shown in FIG. 14. The "for" loop flow control-related nodes include a "for" operator node 1404, a loopControlExpressionList node 1406, an initExprList node 1408, a loopConditionExprList node 1410, and a stepExprList node 1412. loopControlExpressionList node 1406 is a parent node for the loop control expression lists used for implementing the for loop, which includes an initial expression list corresponding to initExprList node 1408 used to define an initial loop expression, a loop condition expression list corresponding to loopConditionExprList node 1410 used to define a loop condition expression (e.g., an loop exit condition), and a step expression list corresponding to a stepExprList node 1412 used to define one or more step expressions used during loop iterations.

In the illustrated embodiment, the initial expression list is "i=0", which is represented in tree 1400 as an 'i' operand node 1414, an '=' assignment operator node 1416, and an operand node 1418 have a constant value of '0'. The initial expression list is delineated with a semicolon node 1420. The loop condition expression list is "i<n", which is represented by an 'i' operand node 1422, a '<' less than operator node 1424, and an 'n' operand node 1426, and is delineated by a semicolon node 1428. The step expression list is "i++", which increments i by 1 each time the loop is executed. This is represented in tree 1400 as an 'i' operand node 1430 and a "++" operator node 1432. In addition, the loop control expression list is delineated by a '(' starting parenthetical node 1400 and an ')' ending parenthetical node 1436.

In addition to the foregoing nodes, tree 1400 includes various nodes that specify associated formatting information, including whitespace nodes 1438 and 1440, single space nodes 1434, 1444, and 1446, and a newline node 1448. As further shown, "for" operator node 1404 is also the parent node for a loop body node 1450 that includes multiple statement nodes 1452, which correspond to statements within the for loop.

In a manner similar to that described above with reference to FIGS. 12 and 13, during unparsing operation 1130 unparser 1203 unparses the localized portion of the structured tree representation (which in this example would correspond to tree 1400) to derive tokens 1204. The tokens are then further processed to display for loop statement 1402 in the editor.

Figure 15B:
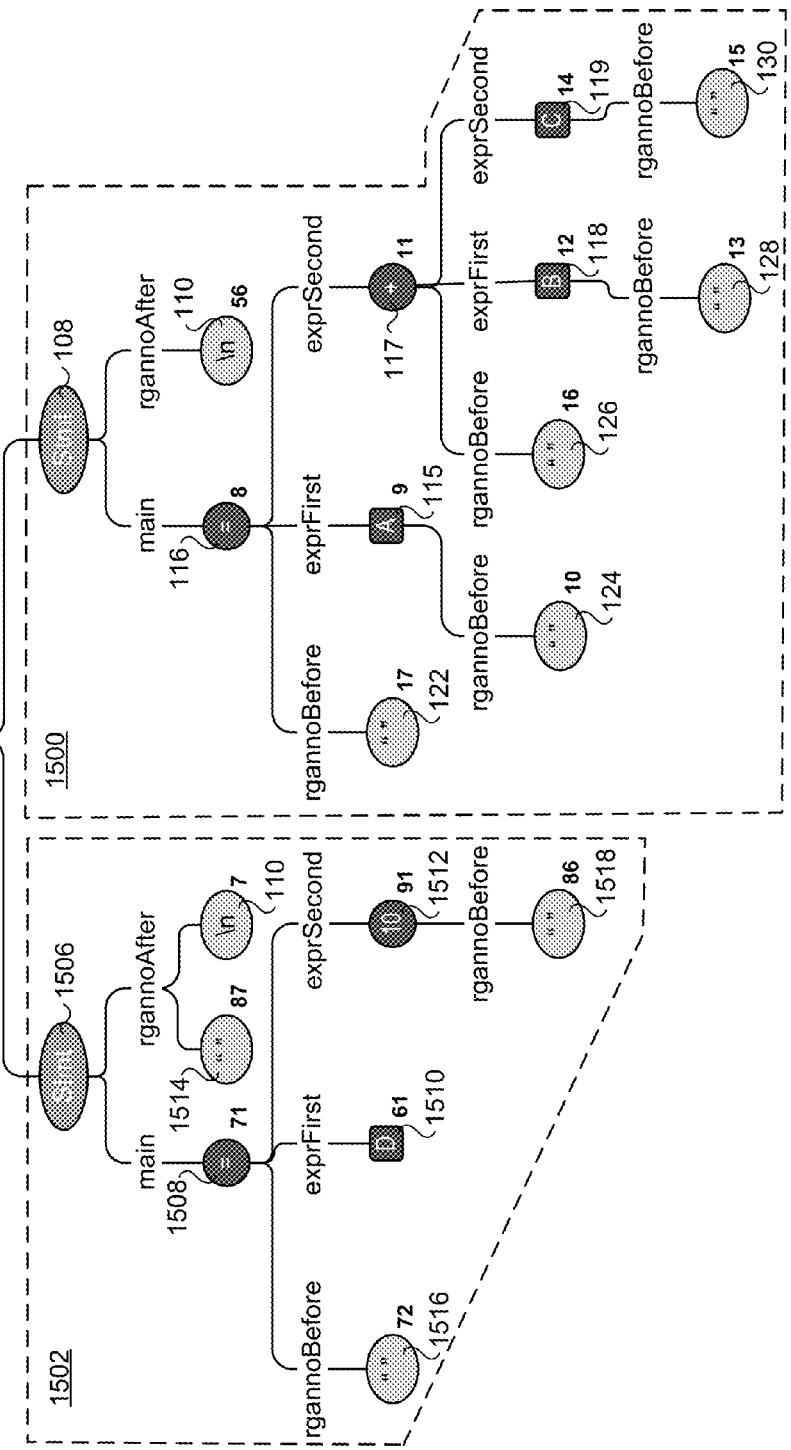

FIGS. 15*a* and 15*b* illustrate an example of how a portion of the structure tree representation relating to a given section of code is preserved when the section of code is moved. As shown by the dashed box outlines in FIG. 15*a*, a respective subtree 1500 and 1502 is generated for each of two statements 102*a* and 1504. Subtree 1500 is the same as the portion of tree 100*a* in FIG. 1*a* below statement node 108. Statement 1504 is an assignment statement assigning the value 10 to variable a 'D'. Accordingly, the root node of subtree 1502 is a statement node 1506, which sits above an '=' operator node 1508, a 'D' operand node 1510, and a 10 constant node 1512. Subtree 1502 further includes single space nodes 1514, 1516, and 1518, and newline node 110.

As shown in FIG. 15*b*, statement 1504 has been moved so that it now proceeds statement 102*a*. This results in the subtrees 110*a* and 1502 being swapped horizontally at the statement level in the structured tree representation hierarchy. Notably, none of the nodes in either subtree 110*a* or 1502 is changed as a result of the statement move operation.

Exemplary Implementation Environments

Generally, the operations and logic for implementing the embodiments disclosed herein will comprise a software instructions corresponding to one or more of a computer application, an IDE, and/or various software modules. The software instructions may be executed on various types of computing devices including but not limited to desktop computers, laptop computers, notebook computers, netbooks, workstations, convertible computers, and tablets. Optionally, the software instructions may be implemented one a server that supports a web-hosted editing application, or may be implemented in a distributed manner between a server and a client, as described below in further detail.

Figure 16:
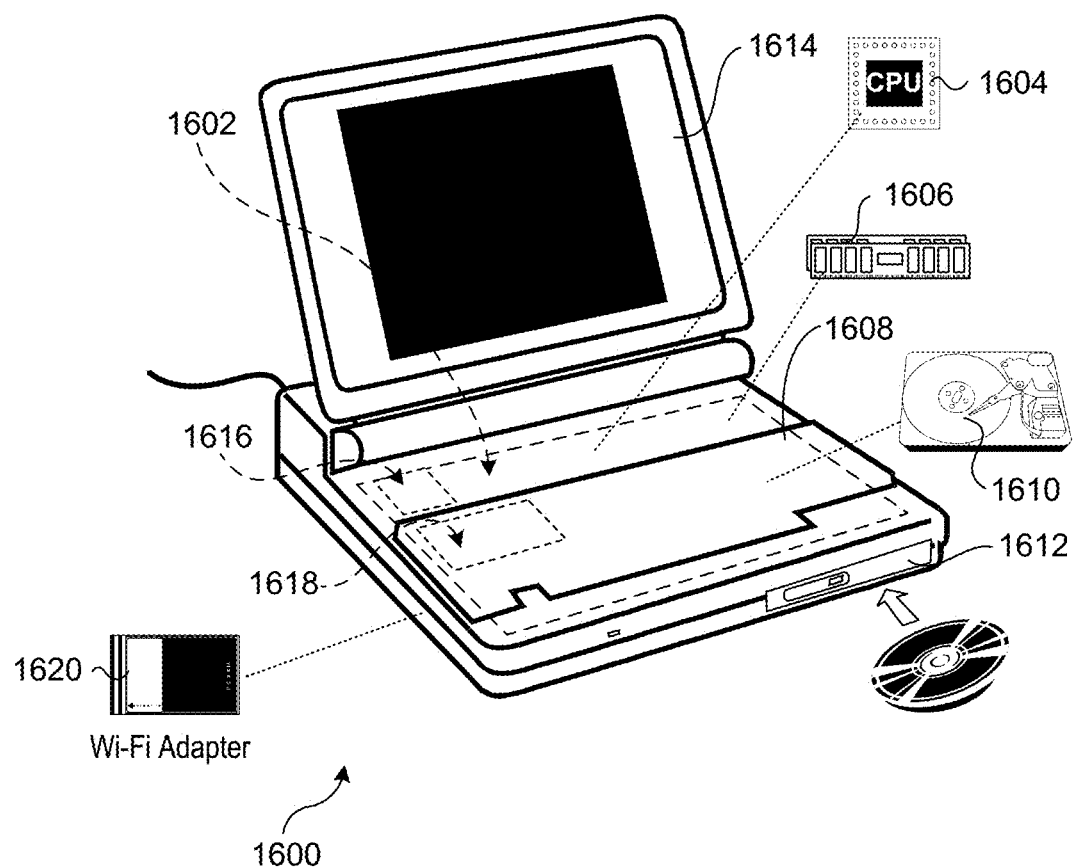
FIG. 16 is a schematic diagram of an exemplary notebook computer on which software implementing aspects of the embodiments disclosed herein may be implemented.
Figure 17:
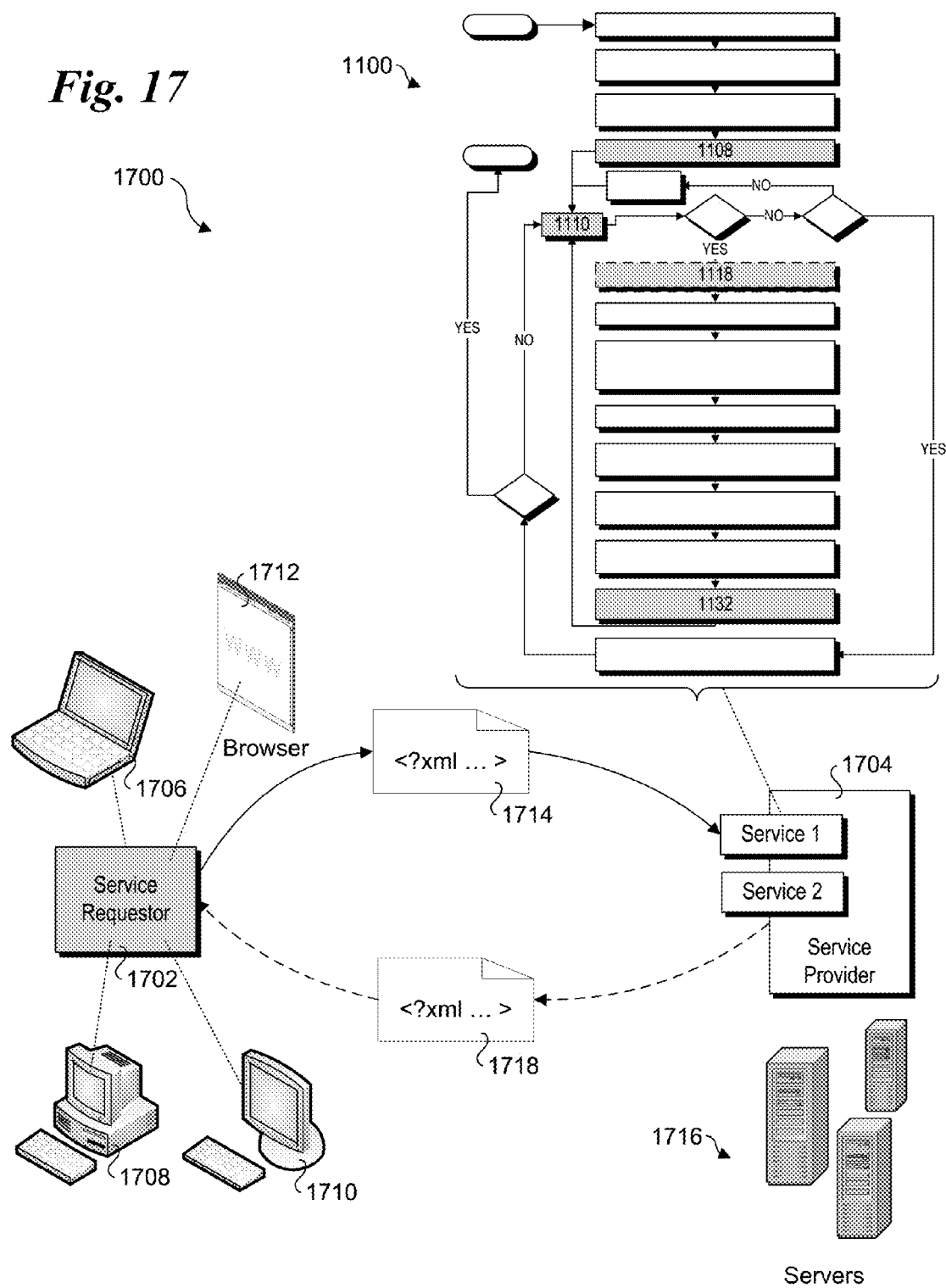
FIG. 17 is a schematic diagram of a Web service architecture that supports interactive editing of source code via a Web service, according to one embodiment.

By way of example and without limitation, FIG. 16 shows one embodiment of notebook computer 1600 which the software instructions may be executed. Notebook computer 1600 includes a chassis in which various components are installed, including a main board 1602 on which a processor 1604 and memory 1606 are installed. A keyboard 1608 is mounted on the chassis and coupled to main board 1602 to enable data entry and the like. Also housed within the chassis are several peripheral components, including a disk drive 1610, and a CD-ROM or combination CD-ROM/DVD-ROM 1612. The main board also includes circuitry (e.g., a graphics chip) for driving a display 1614 coupled to the chassis. The various circuit components are powered via a power conditioner 1216 (when the notebook is plugged into an AC outlet) and a battery 1218 (when mobile). Notebook computer 1600 will also typically include one or more means for connecting to a computer network, such as a IEEE 802.11 "Wi-Fi" adaptor 1620 and/or a wired Ethernet Network Interface Controller (NIC) (not shown).

Generally, processor 1604 may comprise a single-core or multi-core processor, such as but not limited to processors manufactured by Intel Corporation and AMD Corporation.

Optionally, processor 1604 may comprise a mobile processor employing a single- or multi-core ARM-based architecture, such as implemented on various Apple iOS and Google Android tablets and some Microsoft Surface tablets. Computing devices suitable for executing the software instructions may employ one of various kinds of operating systems, such as but not limited to Microsoft Windows-based operating systems, Apple OS X operating systems, Linux-based operating systems, UNIX-based operating systems, Apple iOS operating systems, and Google Android operating systems.

Web Service Implementation

In addition to implementations that run on an individual computer or workstation, it is envisioned that aspects of the editor embodiments described herein may be implemented as a web service. Examples of well-known web services include Google Docs and various cloud-hosted e-mail and storage services, such as provided by Microsoft (Hotmail), Apple (i-Cloud), Google (Gmail) and Yahoo (Yahoo mail). Web services are generally implemented using a service-oriented architecture (SOA). There are a plethora of different approaches, standards, and technologies for implementing Web services, and the implementation described herein is merely a non-limiting example of one approach.

FIG. 1700 shows a Web services architecture 1700 under which a service requestor 1702 accesses a Web service hosted by a service provider 1704. It is presumed that an initial setup phases has already been performed under which service requestor 1702 is authenticated with service provider 1704 and has been served HTML-based content corresponding to one or more Web pages that are used to build an editor user interface on a service requestor 1702 host device, such as a laptop 1706, or desktop computers 1708 and 1710. Generally, the HTML-based content will include HTML and CSS (Cascaded Style Sheet) content and JavaScript, and may further include XML (Extended Markup Language), JSON (JavaScript Object Notation), and/or other types of content.

To facilitate user interaction with the Web service, a Web browser 1712 running on the service requestor 1702 host device renders the HTML-based content, sends content reflective of user edits to service provider 1704, and receives updated display content from service provider 1704. The most common formats for transferring data between a Web service host and client (e.g., service requestor 1702) is XML and (more recently) JSON. In the embodiment illustrated in FIG. 1700, XML content 1714 comprising data corresponding to a user edit is sent from the browser to service provider 1704, and in response, the XML is processed on one or more service applications running on one or more servers 1716 used for implementing the Web service, and XML content 1718 including data for effecting a change in the user interface to reflect the edit is returned. Generally, the XML content will be structured in accordance with a standard protocol using an application interface described by one or more Web Services Description Language (WSDLs), which describe services using XML as a collection of operations that may be performed on typed data sent to and from the service. More generally, the interfaces may be described by APIs written in a particular programming language, such as Java, Ruby, Python, etc.

Historically, most Web services were implemented by sending XML data over SOAP (Simple Object Access Protocol) and/or using HTTP or HTTPS. More recently, many Web services are being implemented using REST (Representational State Transfer) and RESTful services and APIs. RESTful services typically transfer data using either JSON or XML. JSON is generally preferred for services that employ for less-complex resources, since it is less verbose than XML for conveying the same data. In addition, a Web service may combine multiple interfaces and protocols, including one or more of SOAP, REST, XML, and JSON. The particular APIs and protocols used are not limiting, and will generally be selected based on the requirements of the Web service to be implemented.

Returning to Web services architecture 1700, during ongoing operations, the vast majority of the logic for implementing the real-time editor functionality in accordance with the embodiments described above is facilitated via software components that are run on one or more of servers 1714. These functions generally corresponding to the operations illustrated in flowchart 1100 of FIG. 11 and described above, except for the user input and display operations, including those performed in blocks 1108, 1110, 1118, and 1132. The operations of blocks 1108, 1110, 1118 and 1132 are facilitated, in part, via the Web service in combination with operations performed by Web browser 1712 running on service requestor 1702's host device.

The embodiments of the system and methods disclosed herein provide numerous advantages over conventional text-based source code editors. The continuous unparsing/text display/edit/parsing/tree update loop combines the convenience of text program editing while maintaining the richness and benefits of a structured program representation. Through use of node identifiers, identity is preserved, which supports incremental re-lexing, identity-aware parsing, and moving source code with minimal changes to the structured tree representation. Error representation is also provided on a real-time basis, assisting the programmer in enter code with proper syntax. The system and methods support the use of tokens of extended representation, such as images, video and audio segments, directly in the editor (as well as the structured tree representation. Strings, comments, and errors are tokenized, with corresponding nodes added to the structure tree representation in a manner that enables the entire text content of the strings, comments and errors to be displayed in the editor without maintaining a separate text-based file to store such information.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled"

may also mean that two or more elements are not in direct contact with each other, but yet still co-operate or interact with each other.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

As discussed above, various aspects of the embodiments herein may be facilitated by corresponding software components and applications, such as software instructions executed by a processor or the like. Thus, embodiments of this invention may be used as or to support a software program, software modules, and/or distributed software executed upon some form of processor, processing core or a virtual machine running on a processor or core or otherwise implemented or realized upon or within a computer-readable or machine-readable non-transitory storage medium. A computer-readable or machine-readable non-transitory storage medium includes any mechanism for storing or transmitting information in a form readable by a machine (e.g., a computer). For example, a computer-readable or machine-readable non-transitory storage medium includes any mechanism that provides (i.e., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A computer-readable or machine-readable non-transitory storage medium may also include a storage or database from which content can be downloaded. The computer-readable or machine-readable non-transitory storage medium may also include a device or product having content stored thereon at a time of sale or delivery. Thus, delivering a device with stored content, or offering content for download over a communication medium may be understood as providing an article of manufacture comprising a computer-readable or machine-readable non-transitory storage medium with such content described herein.

Various components referred to above as processes, servers, or tools described herein may be a means for performing the functions described. The operations and functions performed by various components described herein may be implemented by software running on a processing element, via embedded hardware or the like, or any combination of hardware and software. Such components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration information, etc.) may be provided via an article of manufacture including computer-readable or machine-readable non-transitory storage medium, which provides content that represents instructions that can be executed. The content may result in a computer performing various functions/operations described herein.

Depending on the particular implementation, software components for implementing aspects of the embodiments herein may be configured to be executed on a single machine, or executed in a distributed environment. As used herein, the software components may be stored on one or more machine-readable media, and software components on a single machine readable medium may be implemented on a single machine or distributed across multiple machines, depending on how the software components are designed to be implemented.

As used herein, a list of items joined by the term "at least one of" can mean any combination of the listed terms. For example, the phrase "at least one of A, B and C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method for enabling interactive editing of software source code, comprising:
maintaining a structured tree representation of the source code, the structured tree representation comprising a plurality of nodes, including nodes associated with respective identifiers, operands, operators, variables, and flow control elements in the source code, and nodes associated with non-syntax aspects of a text-based representation of the source code; and
enabling the source code to be interactively edited by performing a continuous loop of operations including,
unparsing a localized portion of the structured tree representation corresponding to a portion of source code displayed via an editor and being edited and deriving tokens corresponding to a localized portion of source code being edited;
processing the tokens to generate a text-based representation of the localized portion of the source code;
enabling the text-based representation of the source code to be edited by a user via the editor;
in response to an edit to the text-based representation of the source code, at least one of,
  i) generating one or more new tokens;
  ii) deleting one or more tokens that existed before the edit; and
  iii) changing text content associated with an existing token;
parsing tokens including tokens corresponding to the portion of the source that was edited; and
processing the parsed tokens to update the localized portion of the structured tree representation to reflect the edit to the source code.

2. The method of claim 1, further comprising performing an incremental lexical analysis of the portion of the text-based representation of the source code to which the edit is made, the incremental lexical analysis resulting in at least one of generating the one or more new tokens and deleting one or more tokens that existed before the edit.

3. The method of claim 1, further comprising:
assigning an identifier to selected types of nodes when the nodes are generated; and
maintaining the identifier for each node for the lifetime of the node.

4. The method of claim 3, further comprising;
including identifiers for nodes in tokens derived from the nodes;
enabling a user to move a selected portion of source code via the editor;
identifying, via the use of identifiers for tokens corresponding to the selected portion of source code, a subtree of the structured tree representation corresponding to the selected portion of source code;
moving the subtree within the structured tree representation in accordance with the move of the selected portion of source code via the editor.

5. The method of claim 3, further comprising linking the identifier with attribute information pertaining to the node, the attribute information including at least one of an identity of an author making the edit to the source code and a timestamp corresponding to at least one of when the edit was made and when the source code including the edit was first saved.

6. The method of claim 1, further comprising:
detecting errors in the source code in real-time as the source code is edited;
generating nodes in the structure tree representation corresponding to the errors that are detected, each node that is generated including an associated token; and
presenting, via the editor, error indicia corresponding to the errors that are detected, the error indicia being generated by,
  unparsing the nodes that are generated in the structured tree representation corresponding to the errors that are detected;
  deriving tokens from the unparsed nodes; and
  processing the tokens to generate the error indicia.

7. The method of claim 1, further comprising:
enabling a user to enter a comment to the text-based representation of the source code via the editor;
tokenizing the comment to generate a plurality of tokens corresponding to the comment; and
adding nodes to the structured tree representation corresponding to the plurality of tokens that are generated.

8. The method of claim 1, further comprising:
enabling a user to enter a string to the text-based representation of the source code via the editor;
generating a plurality of tokens from the string; and
adding nodes to the structured tree representation corresponding to the plurality of tokens that are generated.

9. The method of claim 1, further comprising:
enabling a user to include a reference to an operand of extended representation in the source code;
generating a token corresponding to the operand of extended representation; and
processing the token to generate a node corresponding to the operand of extended representation.

10. The method of claim 9, wherein the operand of extended representation comprises one of an image, video, and audio segment.

11. The method of claim 9, wherein the reference to the operand of extended representation is depicted via a non-textural means in the editor.

12. The method of claim 9, wherein the reference to the operand of extended representation in the source code is depicted via a text-based descriptor in the editor, wherein the text-based descriptor is only editable as a whole.

13. The method of claim 12, wherein the text-based descriptor comprises a Uniform Resource Locator (URL) corresponding to a resource location via which the operand of extended representation may be accessed.

14. The method of claim 1, wherein the structured tree representation includes branches extending from parent nodes to child nodes, and wherein the method further comprises adding annotations to the branches indicating a relationship between a parent node and a child node.

15. The method of claim 1, wherein the non-syntax aspects of the text-based representation of the source code include one or more of text formatting, errors, and comments.

16. The method of claim 1, wherein the method is implemented as a web service that enables interactive editing of software source code.

17. At least one tangible non-transitory machine-readable medium having instructions store thereon configured, upon execution by one or more machines, to enable interactive editing of software source code by performing operations comprising:
maintaining a structured tree representation of the source code, the structured tree representation comprising a plurality of nodes, including nodes associated with respective identifiers, operands, operators, variables, and flow control elements in the source code, and nodes associated with non-syntax aspects of a text-based representation of the source code; and
enabling the source code to be interactively edited by performing a continuous loop of operations including,
  unparsing a localized portion of the structured tree representation corresponding to a portion of source code displayed via an editor and being edited and deriving tokens corresponding to a localized portion of source code being edited;
  processing the tokens to generate a text-based representation of the localized portion of the source code;
  enabling the text-based representation of the source code to be edited by a user via the editor;
  in response to an edit to the text-based representation of the source code, at least one of,
    i) generating one or more new tokens;

ii) deleting one or more tokens that existed before the edit; and iii) changing text content associated with an existing token;

parsing tokens including tokens corresponding to the portion of the source that was edited; and processing the parsed tokens to update the localized portion of the structured tree representation to reflect the edit to the source code.

18. The at least one tangible non-transitory machine-readable medium of claim 17, wherein execution of the instructions further performs an incremental lexical analysis of the portion of the text-based representation of the source code to which the edit is made, the incremental lexical analysis resulting in at least one of generating the one or more new tokens and deleting one or more tokens that existed before the edit.

19. The at least one tangible non-transitory machine-readable medium of claim 17, wherein execution of the instructions performs further operations comprising:
assigning an identifier to selected types of nodes when the nodes are generated; and
maintaining the identifier for each node for the lifetime of the node.

20. The at least one tangible non-transitory machine-readable medium of claim 19, wherein execution of the instructions performs further operations comprising:
including identifiers for nodes in tokens derived from the nodes;
enabling a user to move a selected portion of source code via the editor;
identifying, via the use of identifiers for tokens corresponding to the selected portion of source code, a subtree of the structured tree representation corresponding to the selected portion of source code;
moving the subtree within the structured tree representation in accordance with the move of the selected portion of source code via the editor.

21. The at least one tangible non-transitory machine-readable medium of claim 19, wherein execution of the instructions further links the identifier with attribute information pertaining to the node, the attribute information including at least one of an identity of an author making the edit to the source code and a timestamp corresponding to at least one of when the edit was made and when the source code including the edit was first saved.

22. The at least one tangible non-transitory machine-readable medium of claim 17, wherein execution of the instructions performs further operations comprising:
detecting errors in the source code in real-time as the source code is edited;
generating nodes in the structure tree representation corresponding to the errors that are detected, each node that is generated including an associated token; and
presenting, via the editor, error indicia corresponding to the errors that are detected, the error indicia being generated by,
unparsing the nodes that are generated in the structured tree representation corresponding to the errors that are detected;
deriving tokens from the unparsed nodes; and
processing the tokens to generate the error indicia.

23. The at least one tangible non-transitory machine-readable medium of claim 17,
wherein execution of the instructions performs further operations comprising:
enabling a user to enter a comment to the text-based representation of the source code via the editor;
tokenizing the comment to generate a plurality of tokens corresponding to the comment; and
adding nodes to the structured tree representation corresponding to the plurality of tokens that are generated.

24. The at least one tangible non-transitory machine-readable medium of claim 17, wherein execution of the instructions performs further operations comprising:
enabling a user to enter a string to the text-based representation of the source code via the editor;
generating a plurality of tokens from the string; and
adding nodes to the structured tree representation corresponding to the plurality of tokens that are generated.

25. The at least one tangible non-transitory machine-readable medium of claim 17, wherein execution of the instructions performs further operations comprising:
enabling a user to include a reference to an operand of extended representation in the source code;
generating a token corresponding to the operand of extended representation; and
processing the token to generate a node corresponding to the operand of extended representation.

26. The at least one tangible non-transitory machine-readable medium of claim 25, wherein the operand of extended representation comprises one of an image, video, and audio segment.

27. The at least one tangible non-transitory machine-readable medium of claim 25, wherein the reference to the operand of extended representation is depicted via a non-textural means in the editor.

28. The at least one tangible non-transitory machine-readable medium of claim 25, wherein the reference to the operand of extended representation in the source code is depicted via a text-based descriptor in the editor, wherein the text-based descriptor is only editable as a whole.

29. The at least one tangible non-transitory machine-readable medium of claim 28, wherein the text-based descriptor comprises a Uniform Resource Locator (URL) corresponding to a resource location via which the operand of extended representation may be accessed.

30. The at least one tangible non-transitory machine-readable medium of claim 17, wherein the structured tree representation includes branches extending from parent nodes to child nodes, and wherein the method further comprises adding annotations to the branches indicating a relationship between a parent node and a child node.

31. The at least one tangible non-transitory machine-readable medium of claim 17, wherein the non-syntax aspects of the text-based representation of the source code include one or more of text formatting, errors, and comments.

32. The at least one tangible non-transitory machine-readable medium of claim 17, wherein the instructions are configured to be executed on a plurality of servers to implement a web service that enables interactive editing of software source code.

* * * * *